(12) United States Patent
Nishizaki et al.

(10) Patent No.: US 8,095,490 B2
(45) Date of Patent: Jan. 10, 2012

(54) USER SUPPORT DEVICE, METHOD, AND PROGRAM

(75) Inventors: Makoto Nishizaki, Kyoto (JP); Tsuyoshi Inoue, Nara (JP)

(73) Assignee: Panasonic Corporation, Osaka (JP)

( * ) Notice: Subject to any disclaimer, the term of this patent is extended or adjusted under 35 U.S.C. 154(b) by 800 days.

(21) Appl. No.: 12/095,277

(22) PCT Filed: Mar. 26, 2007

(86) PCT No.: PCT/JP2007/056229
§ 371 (c)(1),
(2), (4) Date: May 28, 2008

(87) PCT Pub. No.: WO2007/116689
PCT Pub. Date: Oct. 18, 2007

(65) Prior Publication Data
US 2009/0327184 A1    Dec. 31, 2009

(30) Foreign Application Priority Data

Mar. 27, 2006    (JP) .................................. 2006-086255

(51) Int. Cl.
G06F 17/00    (2006.01)
G06N 5/02    (2006.01)
(52) U.S. Cl. ........................................................ 706/46
(58) Field of Classification Search .................... 706/46
See application file for complete search history.

(56) References Cited

U.S. PATENT DOCUMENTS

| | | | |
|---|---|---|---|
| 5,230,628 A | 7/1993 | Kaneko et al. | |
| 5,822,123 A * | 10/1998 | Davis et al. | 725/43 |
| 5,978,595 A | 11/1999 | Tanaka et al. | |
| 6,262,730 B1 * | 7/2001 | Horvitz et al. | 715/707 |

FOREIGN PATENT DOCUMENTS

| | | |
|---|---|---|
| JP | 4-44113 | 2/1992 |
| JP | 5-11953 | 1/1993 |
| JP | 7-336477 | 12/1995 |
| JP | 2576407 | 11/1996 |
| JP | 10-154057 | 6/1998 |
| JP | 11-259202 | 9/1999 |
| JP | 2000-227826 | 8/2000 |
| JP | 2003-196236 | 7/2003 |
| JP | 2005-182313 | 7/2005 |

OTHER PUBLICATIONS

International Search Report issued May 22, 2007 in the International (PCT) Application of which the present application is the U.S. National Stage.

Akinori Komatsubara, "Taiwa-gata shisutemu no ninchi ningen kogaku sekkei" (Interactive System Design Using Cognitive Ergonomics), 1991, p. 91.

* cited by examiner

*Primary Examiner* — Jeffrey A Gaffin
*Assistant Examiner* — Ben Rifkin
(74) *Attorney, Agent, or Firm* — Wenderoth, Lind & Ponack, L.L.P.

(57) ABSTRACT

A user support device which accurately judges that a user is in a confused state and supports the user is provided. The user support device includes: a confused state judging unit which judges whether the user is in a confused state or not based on a tendency of variation in dwell time on which a decision making time until a next input action is executed is reflected in a sequence of input actions executed by the user who makes transitions between several menus arranged in a tree structure; and an operation support processing unit which provides operation support when the confused state judging unit makes a positive judgment that the user is in a confused state.

12 Claims, 26 Drawing Sheets

FIG. 5

| Input action index | Display screen ID | Operation button | Hierarchical layer information | Dwell time | Eye movement time 30 ms x the number of items | Decision making time | Operation time |
|---|---|---|---|---|---|---|---|
| 1 | NULL | Power source | NULL | 0 | 0 | 0 | 0 |
| 2 | NULL | Menu | 0 | 3 | 0.2 | 2.7 | 0.1 |
| 3 | A | Down | 1 | 10 | 0.2 | 9.7 | 0.1 |
| 4 | A | Down | 1 | 5 | 0.2 | 4.7 | 0.1 |
| 5 | A | Enter | 1 | 3 | 0.2 | 2.7 | 0.1 |
| 6 | D | Down | 2 | 15 | 0.2 | 14.7 | 0.1 |
| 7 | D | Down | 2 | 5 | 0.2 | 4.7 | 0.1 |
| 8 | D | Up | 2 | 3 | 0.2 | 2.7 | 0.1 |
| 9 | D | Return | 2 | 10 | 0.2 | 9.7 | 0.1 |
| 10 | A | Up | 1 | 5 | 0.2 | 4.7 | 0.1 |
| 11 | A | Down | 1 | 2 | 0.2 | 1.7 | 0.1 |
| 12 | A | Down | 1 | 10 | 0.2 | 9.7 | 0.1 |
| 13 | A | Enter | 1 | 3 | 0.2 | 2.7 | 0.1 |
| 14 | E | Return | 2 | 15 | 0.2 | 14.7 | 0.1 |
| 15 | A | Down | 1 | 15 | 0.2 | 14.7 | 0.1 |
| 16 | A | Down | 1 | 2 | 0.2 | 1.7 | 0.1 |
| 17 | A | Enter | 1 | 2 | 0.2 | 1.7 | 0.1 |
| 18 | G | Down | 2 | 10 | 0.2 | 9.7 | 0.1 |
| 19 | G | Return | 2 | 15 | 0.2 | 14.7 | 0.1 |
| 20 | A | | 1 | | | | |

| Input action index | Display screen ID | Operation button | Hierarchical layer information | Dwell time | Eye movement time | Decision making time | Operation time |
|---|---|---|---|---|---|---|---|
| 1 | NULL | NULL | NULL | 0 | 0 | 0 | 0 |
| 2 | NULL | Power source | 0 | 3 | 0.2 | 2.7 | 0.1 |
| 3 | A | Menu | 1 | 10 | 0.2 | 9.7 | 0.1 |
| 4 | A | Down | 1 | 5 | 0.2 | 4.7 | 0.1 |
| 5 | A | Down | 1 | 3 | 0.2 | 2.7 | 0.1 |
| 6 | D | Enter | 2 | 15 | 0.2 | 14.7 | 0.1 |
| 7 | D | Down | 2 | 5 | 0.2 | 4.7 | 0.1 |
| 8 | D | Down | 2 | 3 | 0.2 | 2.7 | 0.1 |
| 9 | D | Up | 2 | 10 | 0.2 | 9.7 | 0.1 |
| 10 | A | Return | 1 | 5 | 0.2 | 4.7 | 0.1 |
| 11 | A | Up | 1 | 2 | 0.2 | 1.7 | 0.1 |
| 12 | A | Down | 1 | 10 | 0.2 | 9.7 | 0.1 |
| 13 | A | Down | 1 | 3 | 0.2 | 2.7 | 0.1 |
| 14 | E | Enter | 2 | 15 | 0.2 | 14.7 | 0.1 |
| 15 | A | Return | 1 | 15 | 0.2 | 14.7 | 0.1 |
| 16 | A | Down | 1 | | | | |

(b)

| Input action index | Display screen ID | Operation button | Hierarchical layer information | Dwell time | Eye movement time | Decision making time | Operation time |
|---|---|---|---|---|---|---|---|
| 3 | A | Down | 1 | 10 | 0.2 | 9.7 | 0.1 |
| 10 | A | Up | 1 | 5 | 0.2 | 4.7 | 0.1 |
| 15 | A | Down | 1 | 15 | 0.2 | 14.7 | 0.1 |

(c)

| Input action sequence number | Decision making time |
|---|---|
| 1 | 9.7 |
| 2 | 4.7 |
| 3 | 14.7 |

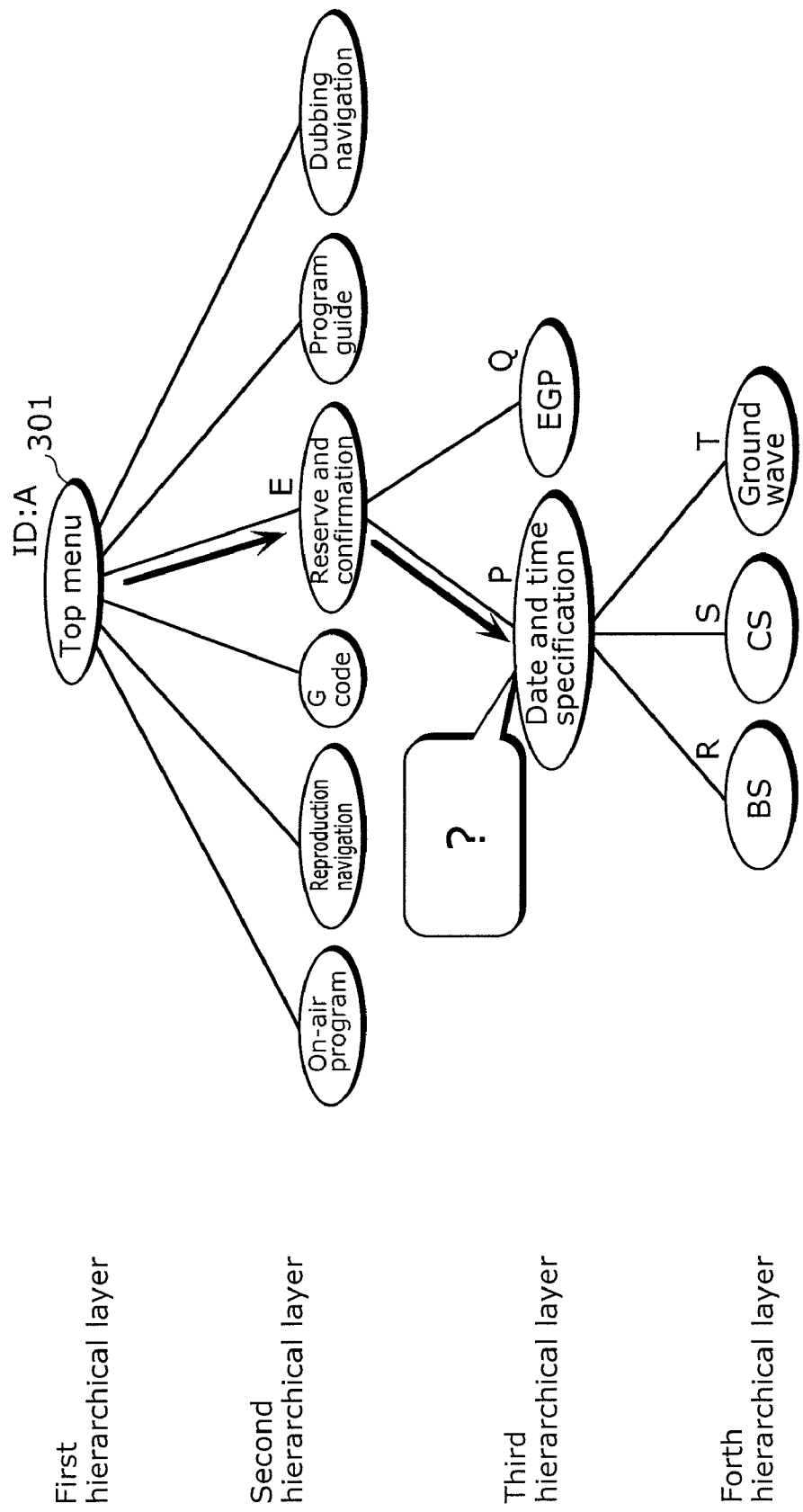

| Input action sequence number | θn | An |
|---|---|---|
| 1 | 20 | 9.7 |
| 2 | 9.7 | 4.7 |
| 3 | 4.7 | 14.7 |

θn < An (b)

| Input action sequence number | θn | An |
|---|---|---|
| 1 | 20 | 9.7 |
| 2 | 15.2 | 4.7 |
| 3 | 9.9 | 14.7 |

θn < An (c)

| Input action sequence number | θn | An |
|---|---|---|
| 1 | 20 | 3.7 |
| 2 | 3.7 | 2.7 |
| 3 | 2.7 | 7.7 |

θn < An (d)

| Input action sequence number | θn | An |
|---|---|---|
| 1 | 20 | 3.7 |
| 2 | 11.9 | 2.7 |
| 3 | 7.3 | 7.7 |

| Confusion factors | Support method |
|---|---|
| Confusion of not being able to find function | Operation guide |
| Confusion due to mismatch of mental model | Function descriptions |
| Confusion in selecting candidate | Item descriptions |

| Display screen ID | Confusion of not being able to find function | Confusion due to mismatch of mental model | Confusion in selecting candidate |
|---|---|---|---|
| A | 0 | 0 | 0 |
| B | 3 | 2 | 3 |
| C | 5 | 0 | 4 |
| D | 3 | 0 | 2 |
| E | 10 | 0 | 1 |
| F | 0 | 0 | 0 |
| : | | | |

1601

USER SUPPORT DEVICE, METHOD, AND PROGRAM

TECHNICAL FIELD

The present invention relates to an interface technique for household appliances and PCs with hierarchical menu structures, and to a technique for supporting an operation by detecting a confused state showing that a user is confused to perform the operation.

BACKGROUND ART

Conventionally disclosed methods relating to such technique for support operations by detecting user states include a method for supporting operations by preparing, in advance, operation patterns occurring in confused states such as "Object undecided" and "Function selection impossible" as data for detecting user states, extracting a confused state candidate based on the operation pattern information, and providing operation support suitable for the confused states (refer to Patent Reference 1). FIG. 26 shows a technique for supporting an operation by detecting a confused state as seen conventionally disclosed in Patent Reference 1.

In FIG. 26, a dwell time threshold for detecting that confusion has occurred is defined in advance, for each display screen, as Absence-of-operation judgment time data 2505. In the case where a dwell time exceeding the threshold (Absence-of-operation state) occurs, a possible confused state candidate is extracted in a user state detection process 2503. In the user state detection process 2503, a confusion candidate is extracted by searching for an operation pattern corresponding to the confusion defined in data for detecting user states 2507 using right truncation. In a support function selection process 2504, a user is guided to present and select a support method suitable for the candidate, and the support suitable for the confused state of the user is provided. The operation patterns used at this time as the data for detecting user states 2507 are not a mere input action sequence but information indicating an operation time classified as short, normal, or long.

The conventional disclosure also includes a facsimile having a feature of judging that a user is confused when there is no input for a predetermined time, and asking the user if a menu structure needs to be printed.
Patent Reference 1: Japanese Unexamined Patent Application Publication No. 10-154057
Patent Reference 2: Japanese Patent No. 2576407

SUMMARY OF THE INVENTION

Problems that Invention is to Solve

In the state detection performed in the user state detection process using the structure of Patent Reference 1, the time needed for each operation executed by a user is indicated as time classification information (short, normal, or long) classified based on the threshold predefined for each display screen, and whether the user is in a confused state or not is judged based on the time classification information related to the motion pattern and the operation.

However, the time needed for a person to perform a normal operation does not depend only on a display screen; such time depends on various aspects such as the skill of each user in using information appliances, and the perception ability or speed and motivation of the user. Thus, it is difficult to accurately judge confusion taking into account differences among individual users and states according to a conventional approach based on the threshold predefined for each display screen.

Likewise, in Patent Reference 2, a judgment on confusion is made in the case where the time needed for an operation exceeds a predefined time, but it is very difficult to set, in advance, an appropriate time for judging such confusion.

The present invention has been made considering these circumstances, and has an object to provide a user support device which is capable of accurately detecting confused states of users by providing user support without excess and deficiency.

Means to Solve the Problems

In order to solve the conventional problem, the user support device according to the present invention supports a user who makes a transition between menus arranged in a tree structure, and the user support device includes: a confused state judging unit which judges, for each of input actions, whether the user is in a confused state or not based on a judgment standard that an increase is observed in a decision making time to decide which input action included in a sequence of input actions which are executed by the user who makes the transition between the menus should be executed; and an operation support processing unit which provides operation support in the case where the confused state judging unit makes a positive judgment that the user is in a confused state, and the confused state judging unit selects, from among the respective decision-making times of the input actions in the sequence, decision making times depending on an immediately-preceding input action, and judges that the user is in a confused state according to the judgment standard that an increase is observed in the selected decision making times.

The present invention can be implemented not only as such user support devices, but also as user support methods, computer programs for supporting users, and computer-readable recording media such as CD-ROMs and DVD-RAMs on each of which the program is recorded.

Effects of the Invention

The user support device according to the present invention judges whether a user is confused to perform an operation or not according to a judgment standard that an increase is observed in a decision making time for deciding which operation should be executed. With the user support device, it becomes possible to accurately detect such confusion in a manner adapted to the skill of each user in using information appliances, and the perception ability and motivation level of the user, while it has been difficult to perform such adapted confusion detection according to a conventional method in which a prefixed threshold for dwell time is used in common for several users.

In this way, since a confused state is detected accurately in a manner adapted to various cases such as the case where a user uses a device for the first time, the case where a user has difficulty in learning device operations, and the case where a user happened to forget how to use a device, the user support device can properly support users without excess and deficiency, according to the detection result.

BRIEF DESCRIPTION OF DRAWINGS

FIG. 5 is a diagram showing an example of operation history information.

FIGS. 7(a), (b), and (c) is a diagram showing input action sequence information for judging confusion of not being able to find a function.

FIG. 8 is a diagram showing an example of input actions where confusion due to a mismatch of a mental model has occurred.

FIGS. 12(a), (b), (c), and (d) is a diagram each of which shows a confusion judging result.

FIG. 16 is a diagram showing an example of confusion and operation support association information.

FIG. 19 is a diagram showing an example of contents stored in a confused location extraction DB.

NUMERICAL REFERENCES

Figure 1:
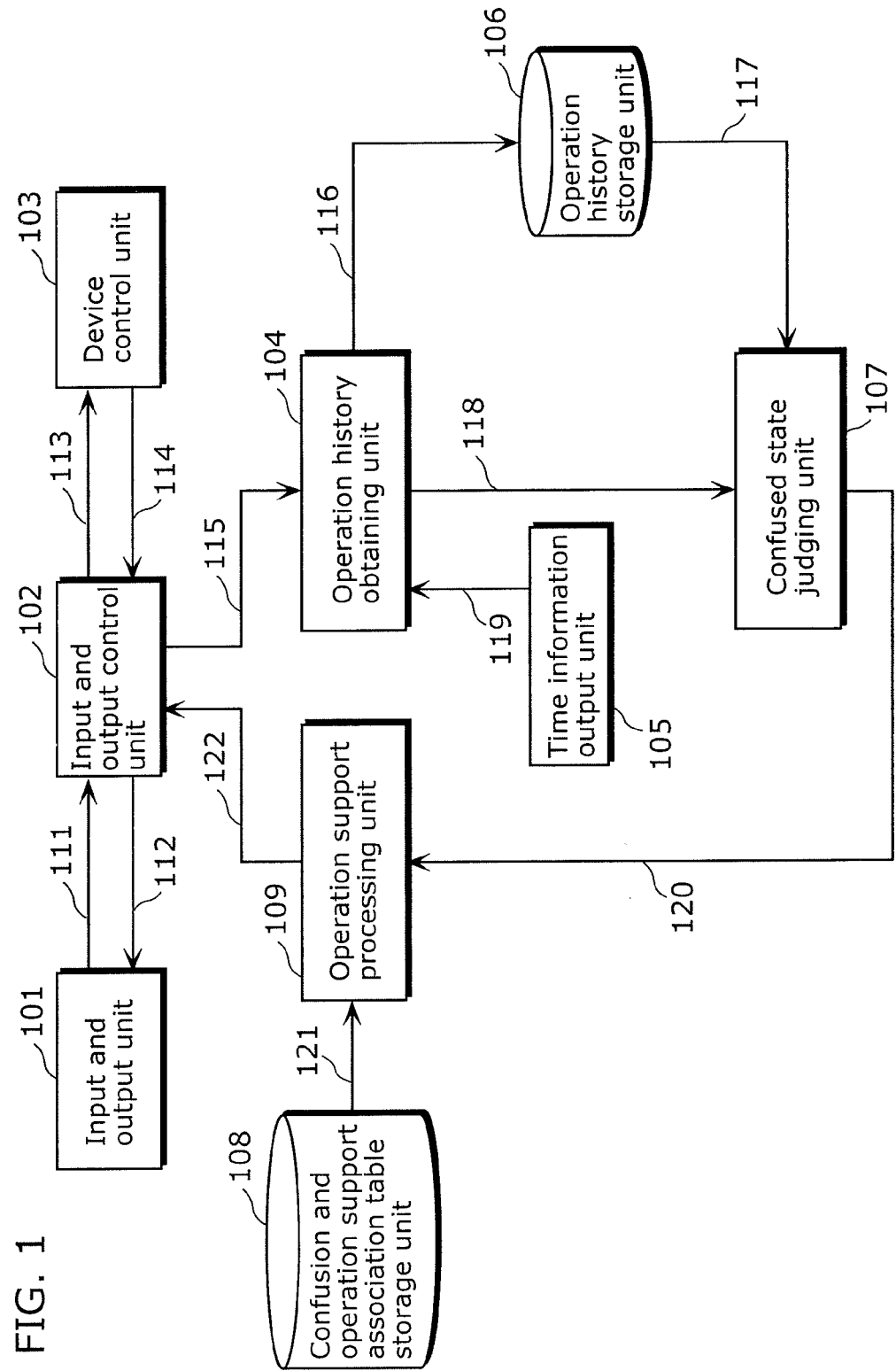
FIG. 1 is a diagram showing the structure of a user support device in a first embodiment of the present invention.

101 Input and output unit
102 Input and output control unit
103 Device control unit
104 Operation history obtaining unit
105 Time information output unit
106 Operation history storage unit
107 Confused state judging unit
108 Confusion and operation support association table storage unit
109 Operation support processing unit
111 Input action signal
112 Output signal
113 Device control signal
114 Control result signal
115 Operation information signal
116 Operation information signal with time information
117 Operation history information signal
118 Device operation timing notification signal
119 Time information signal
120 Confusion detection signal
121 Confusion and operation support association information signal
122 Operation support signal
301 Top menu
302 Menu
303 Menu
304 Program guide node
401 Remote controller
402 Cursor key
403 Enter button
404 Return button
405 Power source button
406 Menu button
1601 Confused location extraction DB
1602 Confused location detection signal
1603 Confused location judgment result signal
1604 Confused location judging unit
1700 User support device
1701 Support information obtaining unit
1702 Network
1703 Support information DB
1704 Support information storage unit
1711 Search condition signal
1712 Search result signal
1713 Support information signal
1901 Confused state dwell time determining unit
1902 Confusion judging unit
1903 Confused state dwell time signal
2503 User state detection process
2504 Support function selection process
2505 Absence-of-operation judgment time data
2507 User state detection data

DETAILED DESCRIPTION OF THE INVENTION

The user support device according to the present invention supports a user who makes a transition between menus arranged in a tree structure, and the user support device includes: a confused state judging unit which judges, for each of input actions, whether the user is in a confused state or not based on a judgment standard that an increase is observed in a decision making time to decide which input action included in a sequence of input actions which are executed by the user who makes the transition between the menus should be executed; and an operation support processing unit which provides operation support in the case where the confused state judging unit makes a positive judgment that the user is in a confused state, and the confused state judging unit selects, from among the respective decision making times of the input actions in the sequence, decision making times depending on an immediately-preceding input action, and judges that the user is in a confused state according to the judgment standard that an increase is observed in the selected decision making times.

The confused state judging unit may judge whether the user is in a confused state or not according to a judgment standard that an increase has been observed in a decision making time which has occurred each time of a transition to a current menu in the case where the immediately-preceding input action has been an input action to make a transition to the current menu from another menu. At this time, the confused state judging unit may approximate the decision making time to a dwell time which has occurred each time of a transition to the current menu, and make a judgment as to whether the user is in a confused state or not based on the judgment standard.

The confused state judging unit may judge whether the user is in a confused state based on the judgment standard that an increase is observed in a decision making time which occurs in each of menus leading to the current menu in the case where the immediately-preceding input action has been for making a transition to the current menu from a higher-layer menu. At this time, the confused state judging unit may approximate the decision making time to a dwell time which occurs for a firstly-executed input action in each of the menus leading to the current menu, and make a judgment as to whether the user is in a confused state or not based on the judgment standard.

The confused state judging unit may judge, for each of the input actions, whether the user is in a confused state or not based on a judgment standard that an increase has been observed in a decision making time which has occurred for the input action executed in the current menu in the case where the immediately-preceding input action has been executed within the current menu. At this time, the confused state judging unit may approximate the decision making time to a dwell time which has occurred for each of input actions executed within the current menu, and make a judgment as to whether the user is in a confused state or not based on the judgment standard.

Especially in the case where the immediately-preceding input action is executed within the menu on which several selection items are shown, it is preferable that selection items are displayed in the current menu, and that the operation support processing unit presents, to the user, description information for each of the selection items, as the operation support when the confused state judging unit makes a positive judgment that the user is in a confused state.

The user support device according to the present invention supports a user who makes a transition between menus arranged in a tree structure, and the user support device may include: a confused state judging unit which judges, for each of input actions, whether the user is in a confused state or not based on a judgment standard that an increase is observed in a decision making time to decide which input action included in a sequence of input actions which are executed by the user who makes the transition between the menus should be executed; an operation support processing unit which provides operation support in the case where the confused state judging unit makes a positive judgment that the user is in a confused state, and a confusion and operation support association table storage unit in which confusion and operation support information indicating a support method suitable for each of categories of confused states may be stored, and the confused state judging unit may select decision making times on which the respective confused states are reflected from among decision making times for all the input actions in the sequence, and judge whether the user is in a confused state or not based on the judgment standard that an increase is observed in the decision making time selected for each confused state, and the operation support processing unit may provide support according to a support method suitable for a confusion category for which the confused state judging unit has made the positive judgment that the user is in a confused state with reference to the confusion and operation support association table storage unit.

Embodiments of the present invention will be described below with reference to the drawings.

First Embodiment

FIG. 1 is a block diagram showing the functional structure of the user support device in a first embodiment of the present invention.

The user support device judges, for each operation in an input action sequence executed by a user, whether the user is confused to perform the operation, based on a variation tendency in a decision making time for deciding which operation should be executed, and in particular, according to the judgment standard that an increase is observed in the decision making time, and provides operation support when it is judged that the user is confused. The user support device includes: an input and output unit 101, an input and output control unit 102, a device control unit 103, an operation history obtaining unit 104, a time information output unit 105, an operation history storage unit 106, a confused state judging unit 107, a confusion and operation support association table storage unit 108, and an operation support processing unit 109.

In FIG. 1, the confused state judging unit 107 is an example of a confused state judging unit; the confusion and operation support association table storage unit 108 is an example of a confusion and operation support association table storage unit; and the operation support processing unit 109, the input and output control unit 102, and the input and output unit 101 are examples of operation support processing units.

The input and output unit 101 functions as an user interface. The input and output unit 101 receives an input action from a user using input devices such as a remote controller, keyboards, a mouse, a touch panel, outputs the input as an input action signal 111, and further presents, to the user, information presented by an output signal 112 via a display, speakers, and the like.

The input and output control unit 102 receives the input action signal 111, outputs a device control signal 113 which is a signal for specifying an application or a device operation, and outputs an operation information signal 115 indicating operation information. Further, the input and output control unit 102 receives a control result signal 114 and an operation support signal 122, and outputs an output signal 112 indicating the information to be presented to the user.

The device control unit 103 receives the device control signal 113, controls the device according to the device control signal 113, and outputs the control result signal 114 which is a response from the device.

The time information output unit 105 outputs a time information signal 119 showing a current time.

The operation history obtaining unit 104 outputs an operation information signal with time information 116. The operation information signal with time information 116 includes: (1) a time for perceiving a menu (the time is, for example, a time for eye movement between items included in the menu, and is referred to as a perception time, or specifically an eye movement time, hereinafter); (2) a time for deciding which operation should be executed (the time is, for example, a time for deciding which item should be selected, and is referred to as a decision making time, hereinafter); and (3) a time for actually performing the decided operation (the time is, for example, a time for pressing a button or the like, and is referred to as an operation time, hereinafter). In addition, the operation history obtaining unit 104 outputs a device operation timing notification signal 118 which is trigger information notifying the input of the operation information signal 115.

The operation history storage unit 106 is a database in which a sequence of operation information with time information presented by the operation information signal with time information 116 is stored as operation history information.

The confused state judging unit 107 obtains an operation history information signal 117 indicating the operation history information from the operation history storage unit 106, and judges a current confused state based on input action sequence information which is a portion reflecting the current confused state to be detected included in the operation history information represented by the obtained operation history information signal 117. Subsequently, when the confused state judging unit 107 judges that a confused state has occurred, it outputs a confusion detection signal 120 indicating the judged confused state.

The confusion and operation support association table storage unit 108 is a database in which details of operation support suitable for confused states are stored.

The operation support processing unit 109 receives a confusion detection signal 120, decides details of operation support with reference to a confusion and operation support association information signal 121, and outputs an operation support signal 122 indicating the decided details of operation support.

A description is given of operations, executed by the user support device, based on the confusion detection structured as described above. An example is described here assuming that the user support device according to this embodiment is mounted on an appliance such as a DVD recorder and a television.

In general, menus of a DVD recorder or a device such as a television are structured to be in a hierarchy, and a desirable function is implemented by sequentially selecting menu items displayed on display screens while going down in the hierarchy.

Figure 2:
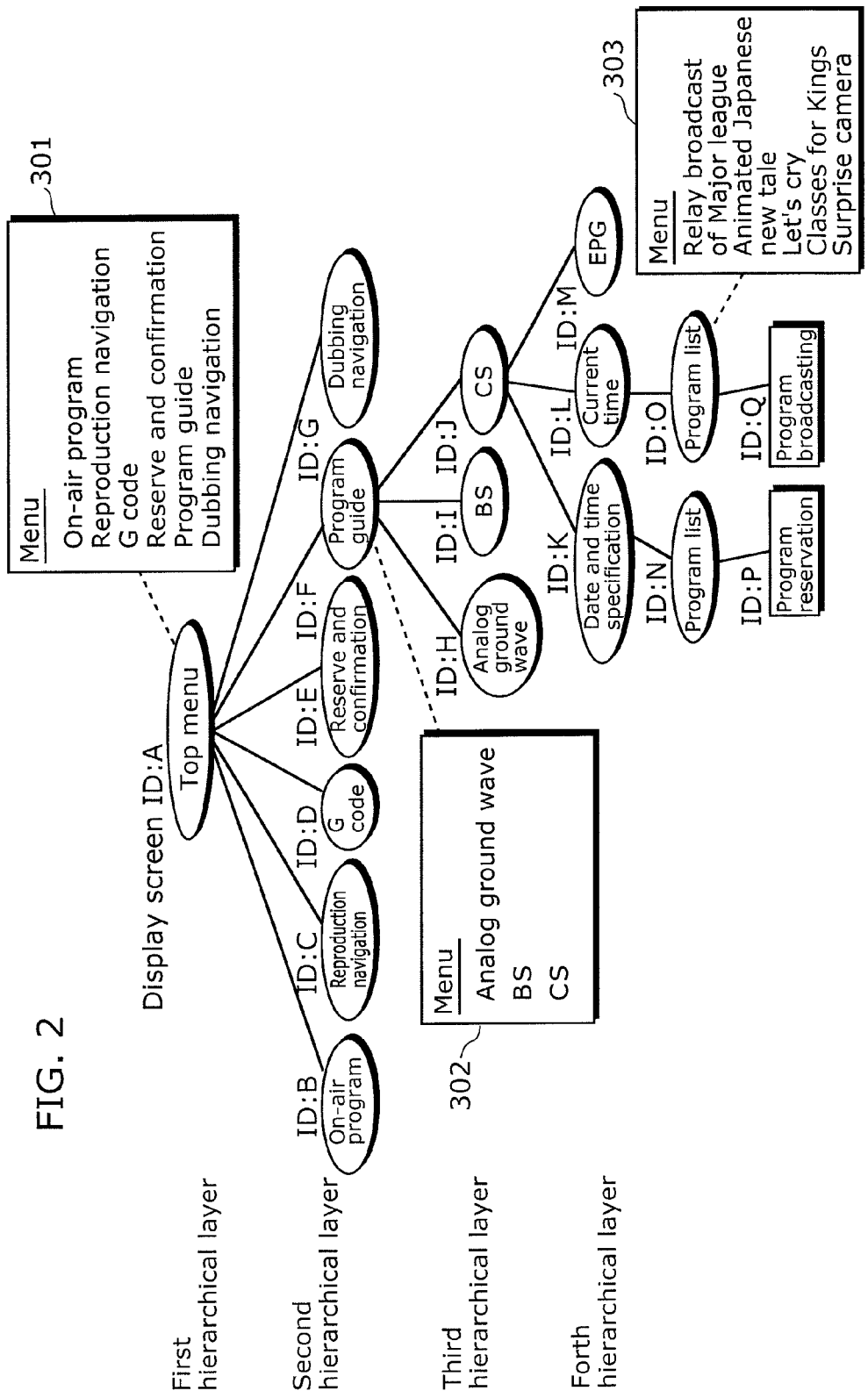
FIG. 2 is a diagram showing an example of a hierarchical menu.

In order to manage current states of the user who uses such hierarchical menus, for example, the input and output control unit 102 uses tree-structure information indicating a menu structure used in the device onto which the menu structure is mounted, as shown in FIG. 2.

In the tree-structure information, each of nodes is assigned with a display screen ID, and each node corresponds to each menu. For example, the node named top menu in the first hierarchical layer is selected first when an operation is started, and a top menu 301 corresponding to a display screen with an ID of A is outputted to the display screen A. For example, assume that the user selects a program guide from among items displayed on the top menu 301. This selection triggers the transition to a node (display screen with an ID of F) named "Program guide" in the second hierarchical layer.

In such tree-structure interface, display screens and hierarchies where a user uses are managed using the tree-structure information as shown in FIG. 2.

Figure 3:
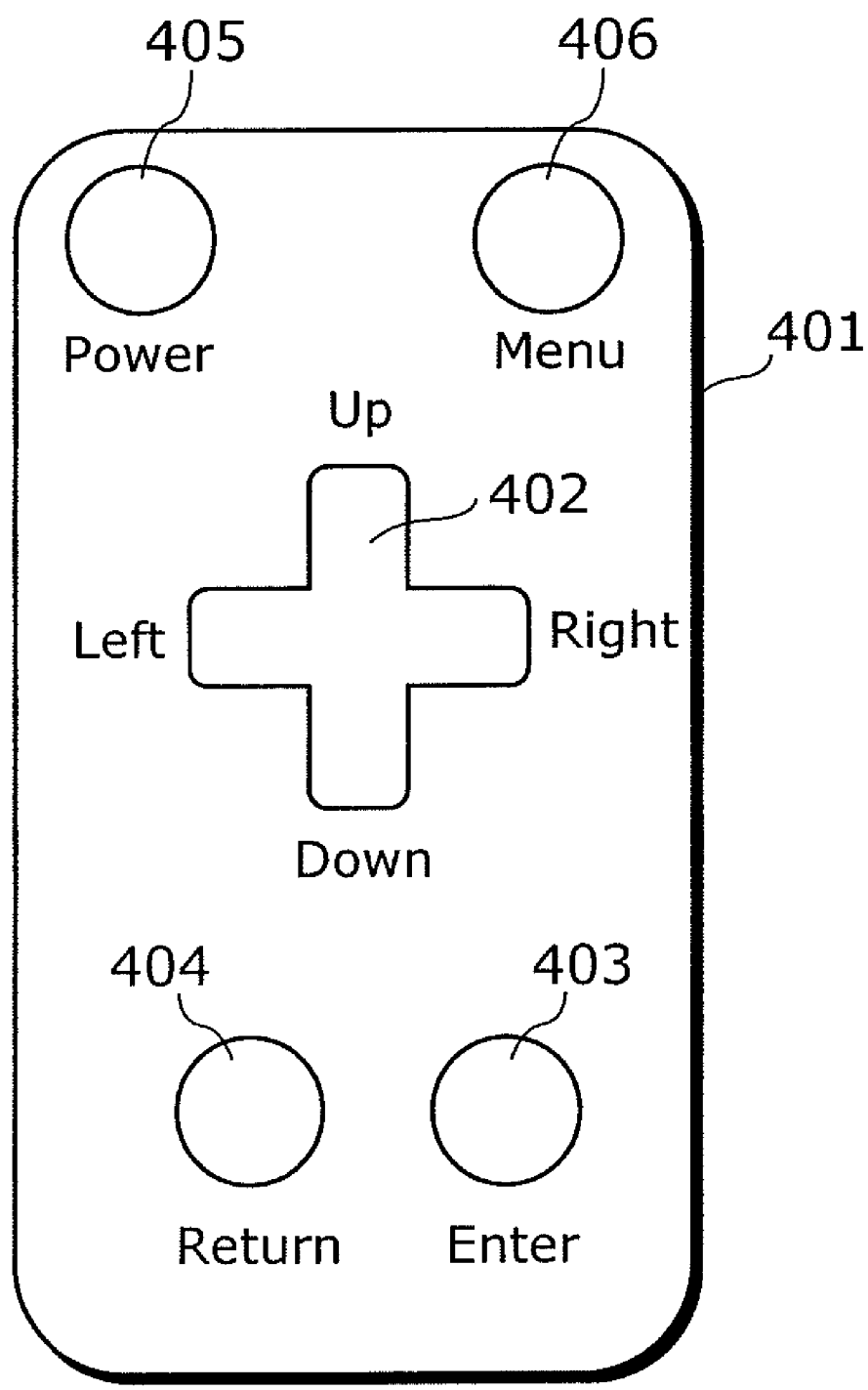
FIG. 3 is a diagram showing an example of an input device.

More specifically, when the user presses a Power supply button 405 of a remote controller 401 in FIG. 3 so as to turn on a power source and presses a Menu button 406, the top menu 301 is displayed first. Subsequently, the use of a cursor key 402 of the remote controller 401 in FIG. 3 can trigger movement to an item in the menu, and a press of an Enter button 403 can make a transition to a lower hierarchical layer and trigger a transition to the next display screen.

Four presses of Down of cursor keys 402 after display of the top menu 301 trigger a movement to the item named program guide, and a press of an Enter button 403 triggers display of a menu 302 defined in a program guide node 304 in the second hierarchical layer. In addition, a press of a Return button 404 can make a return to the top menu 301 defined in the top menu node in the first hierarchical layer which is immediately above the current hierarchical layer.

In addition, for example, when the user wishes to view an on-air CS broadcast program, the user can view the program by: going down in the hierarchy by selecting, in sequence, "Top menu", "Program guide", "CS", "Current time", and "Program list" so as to display a menu 303 indicating the list of on-air CS broadcast programs; and selecting the target program in the program list.

Figure 4:
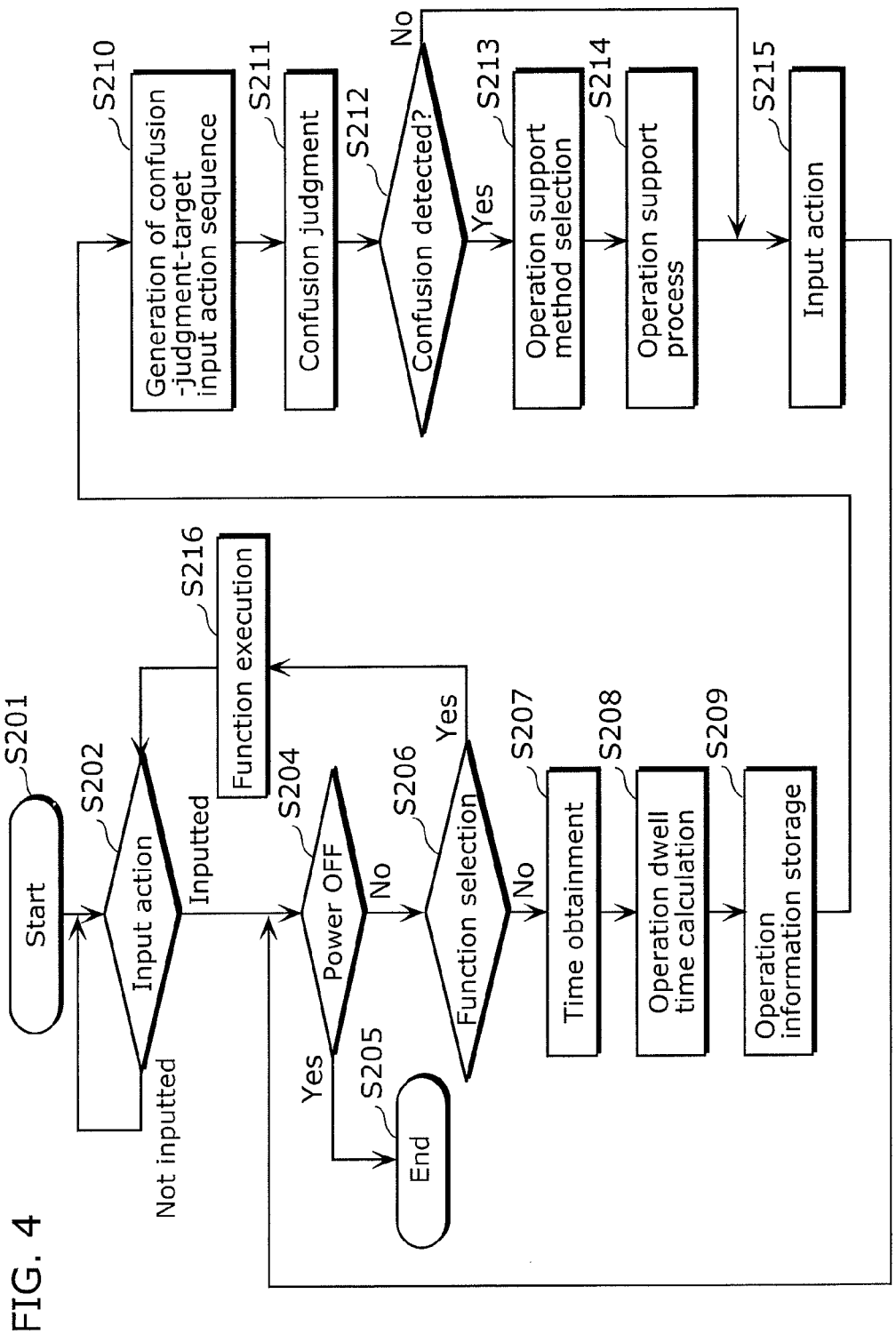
FIG. 4 is a flowchart showing the processing of the user support device in the first embodiment of the present invention.

Operations that the user support device performs when using such hierarchical menus according to the confusion detection in the present invention are described with reference to the flowchart shown in FIG. 4.

First, turning on the power source in Step S201 starts the following processing.

In Step S202, the input and output unit 101 detects an input action, and outputs an input action signal 111 to the input and output control unit 102.

In Step S204, the input and output control unit 102 judges whether the input action signal 111 indicates that the power source is OFF. A transition to Step S205 is made when the power source is OFF, and otherwise, a transition to Step S206 is made.

In Step S205, the input and output control unit 102 finishes the processing.

In Step S206, the input and output control unit 102 judges whether the input action signal 111 is for a function determination operation corresponding to the selection of a leaf in the menu hierarchy, and when the input action signal 111 is for the function determination operation, a device control signal 113 is outputted to the device control unit 103 and a transition to Step S216 is made, and otherwise, a transition to Step S207 is made.

In Step S216, the device control unit 103 executes the function.

In Step S207, the input and output unit 102 transmits an operation information signal 115 to the operation history obtaining unit 104, in other words, the operation history obtaining unit 104 obtains a time information signal 119 indicating a current time.

In Step S208, the operation history obtaining unit 104 measures a dwell time indicating a time elapsed from the time of previous operation, based on the time information signal 119 in the case where the input action is the second or one of the subsequent input actions. In addition, the operation history obtaining unit 104 calculates a perception time (for example, an eye movement time), a decision making time and an operation time included in the dwell time.

The time needed for eye movement is considered to be 30 ms per item (Non-patent Reference: "*Taiwa-gata shisutemu no ninchi ningen kogaku sekkei* (Interactive System Design Using Cognitive Ergonomics), page 91, 1991, Akinori Komatsubara). Thus, the eye movement time for perceiving a menu can be determined in advance based on the number of items displayed on a display screen. In addition, the time for a press of a button is considered to be 100 to 129 ms (the above Reference, page 92). Thus, the operation time for each menu can be estimated to be a fixed time (for example, 0.1 second). The decision making time can be calculated by subtracting the eye movement time and operation time from the dwell time.

Here, the eye movement time can be regarded as a fixed time because the number of items in an operation menu of a DVD recorder or a mobile phone is approximately 5 to 10 at most, and the eye movement time occupies a small portion of the dwell time. For example, assuming that seven selection items are outputted on average, the eye movement time can be estimated to be 0.2 second.

In Step S209, the operation history obtaining unit 104 outputs the following as an operation information signal with time information 116: a dwell time, an eye movement time, a decision making time, an operation time, an operation category, the ID of the display screen which is a transition destination according to an input action, and hierarchy information. The operation history storage unit 106 stores, as operation history information, a sequence of operation information with time information indicated by the operation information signal with time information 116.

Here, FIG. 5 shows an example of operation history information stored in the operation history storage unit 106. Each line of the operation history information shows operation information with time information associated with an input action.

An input action index shows the order of an input action in a sequence of input actions. A display screen ID shows the hierarchical menu in which the input action is executed. Hierarchical information shows the order of the hierarchical layer corresponding to the menu. The meaning of the dwell time, eye movement time, decision making time, and operation time is the same as described earlier.

How to store information is shown specifically. Assume that the user displays the display screen A at a current input action indexed by 3. Since the display screen ID is A, the hierarchy is 1 and thus the hierarchy information is represented as 1. Assume that the operation menu "Down" is pressed in ten seconds from when the menu is displayed. Specifically, a press of "Down" is detected in Step S202.

Subsequently, a current time is obtained in Step S207. In Step S208, the following are calculated: a dwell time (10 seconds) elapsed from the immediately-preceding input action, an eye movement time, a decision making time, and an operation time. Here, assuming that seven selection items are displayed, the eye movement time for each of the seven selection items is approximated as a fixed time of 0.2 second. In addition, although the operation time varies from 100 to 129 ms, it is approximated as a fixed time of 0.1 second here. Subsequently, the decision making time is calculated by subtracting the fixed eye movement time and operation time from the dwell time (10−0.2−0.1=9.7 seconds).

In Step S209, the calculated pieces of time are stored in a dwell time column, an eye movement time column, a decision making time column, and an operation time column which are associated with the input action indexed by 3, and an input action category "Down" is stored in an input action button column which is associated with the input action indexed by 3. Further, the ID of A of the display screen which is the destination of the transition made through the input action and information indicating the first hierarchical layer are stored in the display screen ID column and a hierarchical information column which are associated with the input action indexed by 4.

With reference to FIG. 4 again, in Step S210 which is the process of generating a confusion judgment target input action sequence, the confused state judging unit 107 generates input action sequence information indicating a sequence of decision making times which reflect specific confused states to be detected, based on the operation history information signal 117 obtained from the operation history storage unit 106. The input action sequence information to be generated differs depending on the confusion category to be detected. A description will be given later of how to generate the input action sequence information for a specific operation among the operations in the operation history information depending on the confusion category.

Subsequently, in Step S211 which is a confusion judgment process, the confused state judging unit 107 judges confusion based on the input action sequence information generated in Step S210. A confusion judgment method will be also described later.

A branch is made in Step S212 depending on whether a confused state has been detected or not. When a confused state is detected, a confusion detection signal 120 is outputted to the operation support processing unit 109 to make a transition to Step S213. Otherwise, a transition to Step S215 is made.

In Step S213, the operation support processing unit 109 selects an operation support method according to the confusion category, based on the confusion and operation support association information signal 121 which is information in the confusion and operation support association table storage unit 108.

In Step S214, operation support is provided based on the operation support method selected by the operation support processing unit 109. The information such as a display screen output necessary for providing operation support is passed to the input and output control unit 102 as an operation support signal 122 so that the information is to be presented to the user. Details of the operation support will be described later.

In Step S215, the input and output unit 101 receives the next input action which has been waited for, and returns to Step S204 to repeat the processing.

Here, a detailed description is given of the process for generating a confusion judgment target input action sequence executed in Step S210.

The process for generating a confusion judgment target input action sequence is executed for each of the input actions executed by the user. Input action sequence information for judging the category of confusion which may occur depending on an immediately-preceding input action is generated in this process. Assuming the following three categories of confused states: "confusion of not being able to find a function", "confusion due to a mismatch of a mental model", and "confusion in selecting a candidate", descriptions are given of: how these three categories are considered based on the corresponding immediately-preceding input actions; and input action sequence information to be generated for these confused states.

Figure 6:
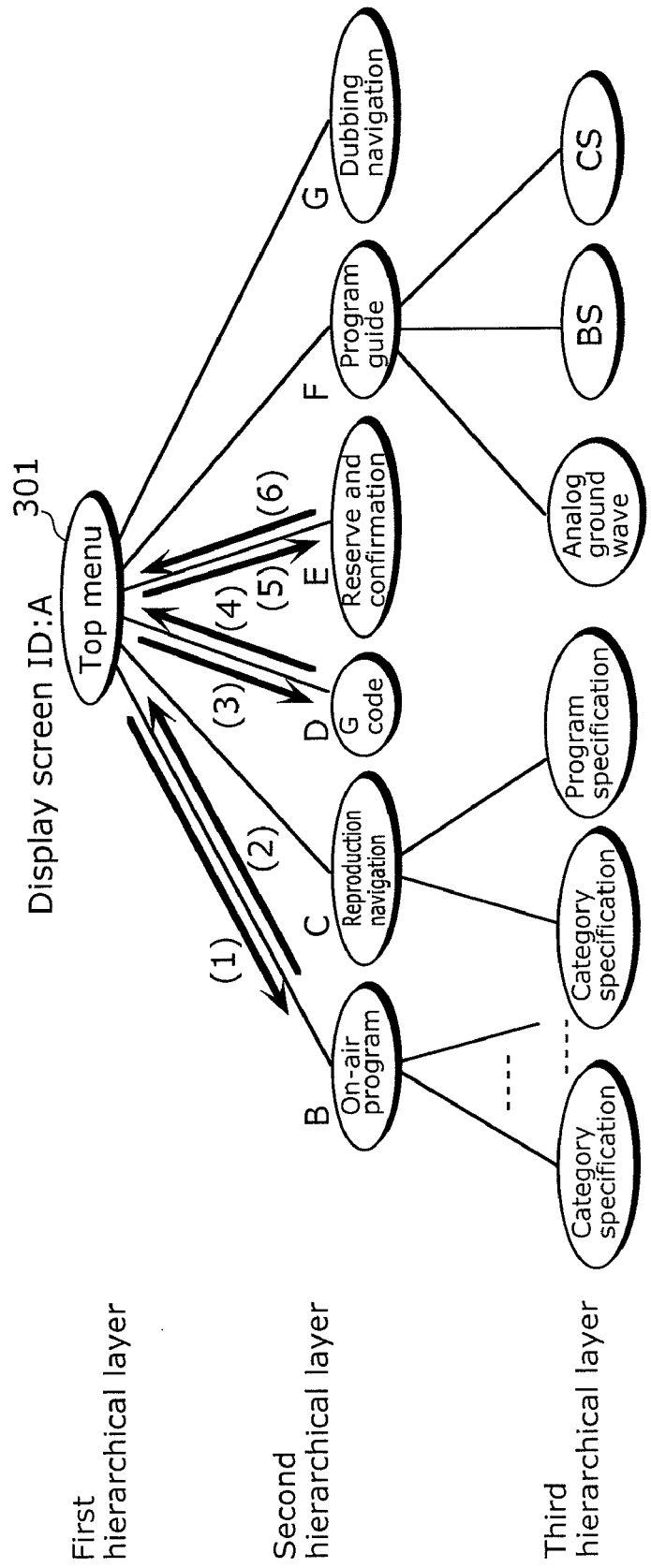
FIG. 6 is a diagram showing an example of input actions where confusion of not being able to find a function has occurred.
Figure 9:
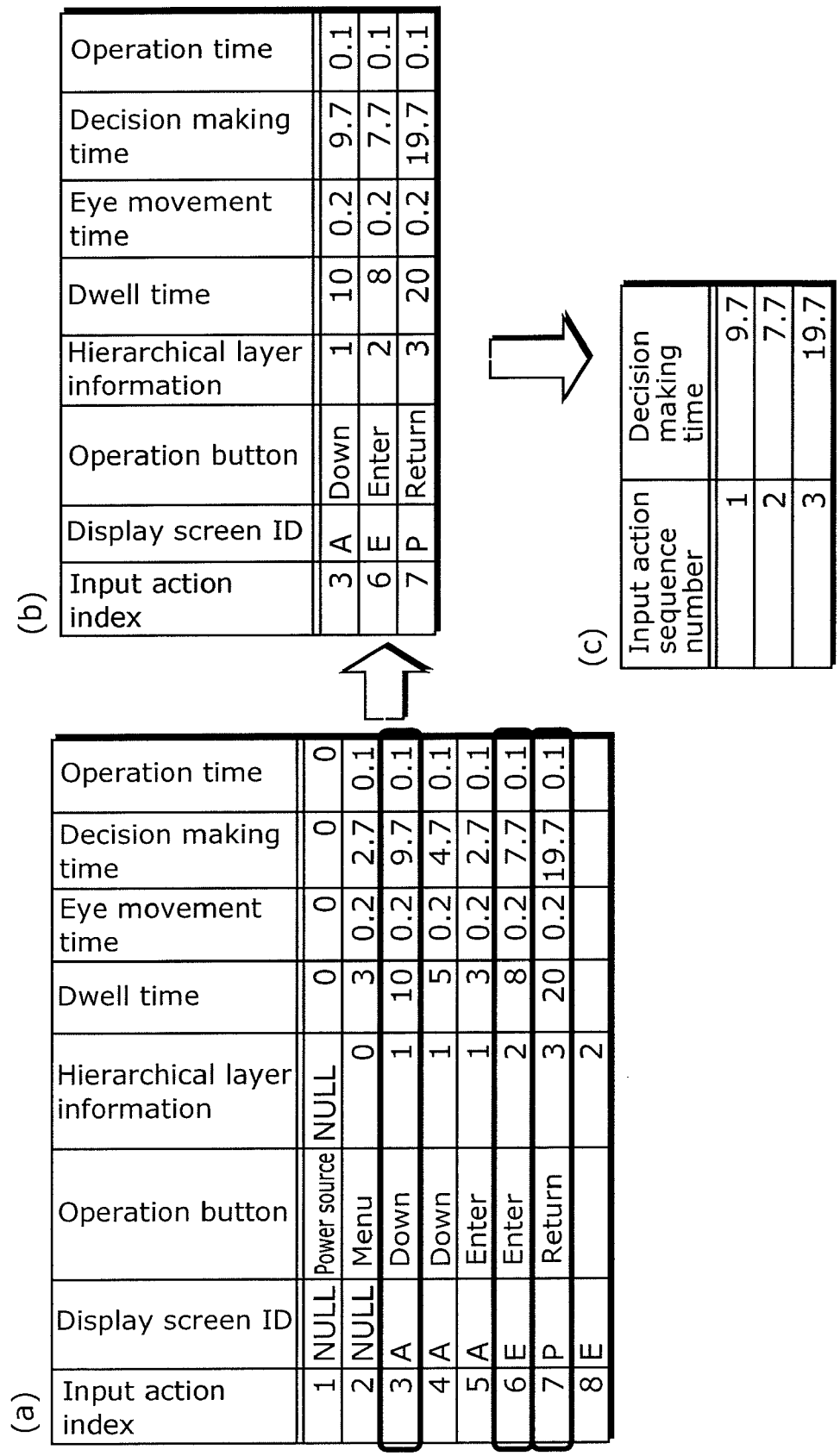
FIGS. 9 (a), (b), and (c) is a diagram showing input action sequence information for judging confusion due to a mismatch of a mental model.
Figure 10:
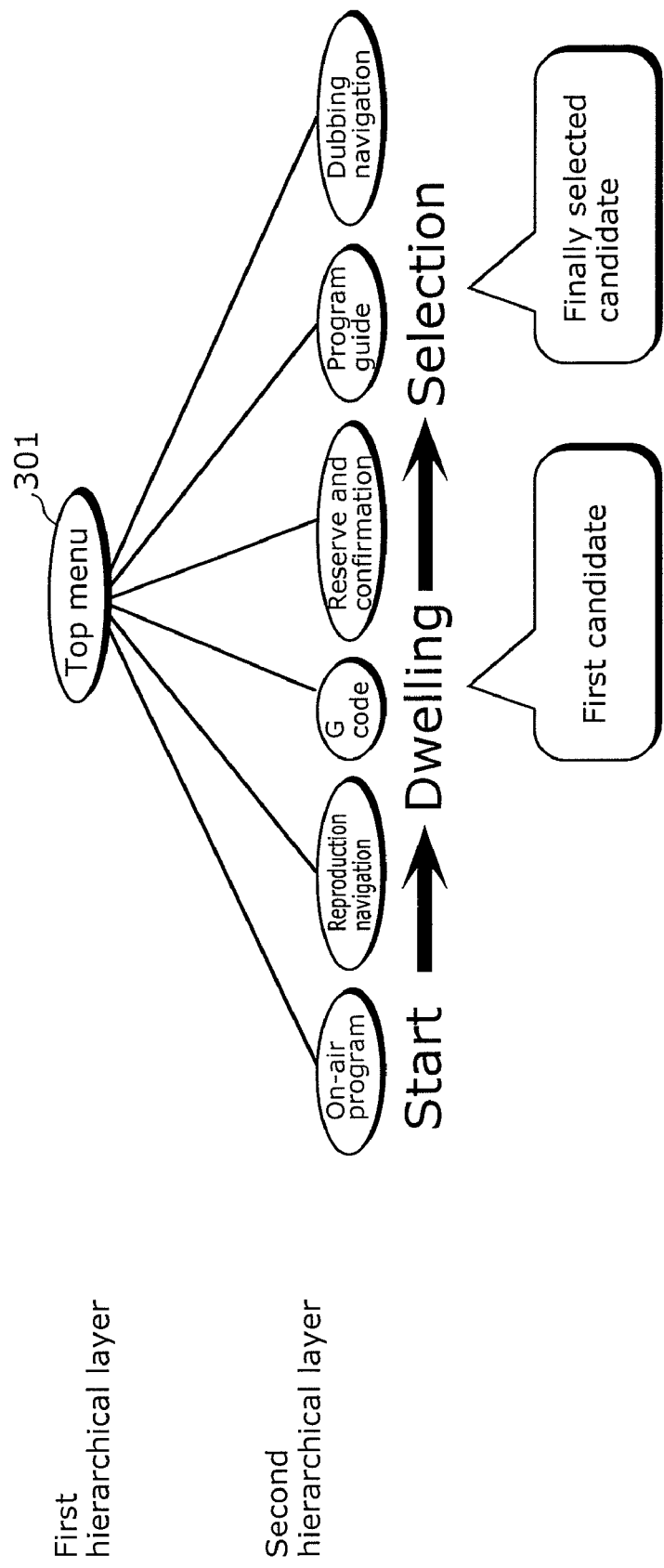
FIG. 10 is a diagram showing an example of an operation where confusion in selecting a candidate has occurred.
Figure 11:
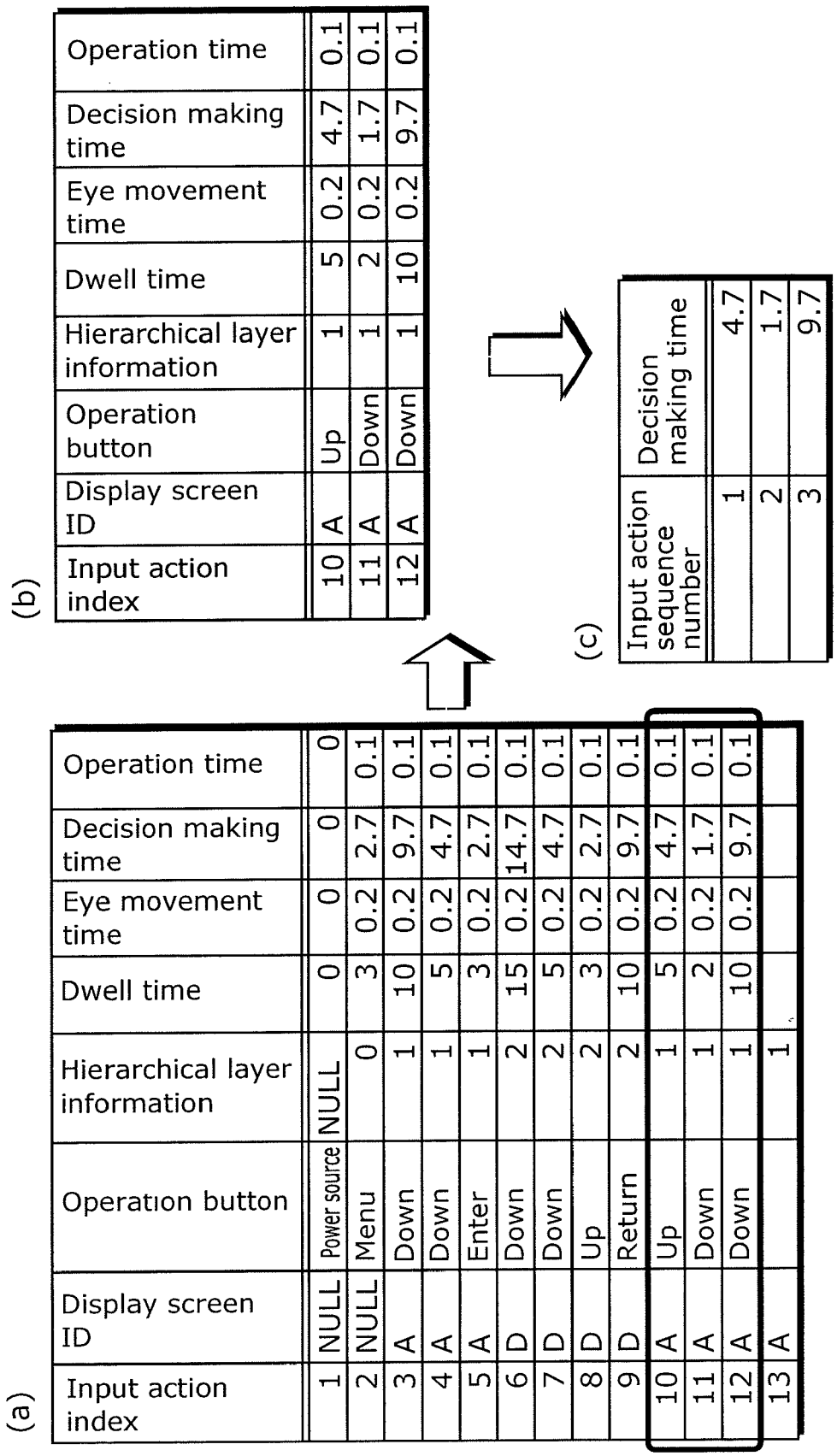
FIGS. 11 (a), (b), and (c) is a diagram showing input action sequence information for judging confusion in selecting a candidate.

FIGS. 6 and 7 illustrate "confusion of not being able to find a function", FIGS. 8 and 9 illustrate "confusion due to a mismatch of a mental model", and FIGS. 10 and 11 illustrate "confusion in selecting a candidate".

First, an example of the "confusion of not being able to find a function" is described. When a user wishes to record an on-air program, and the user is confused to find a recording function in a menu hierarchy, the confusion is the "confusion of not being able to find a function".

FIG. 6 specifically illustrates user's actions leading to a confused state. The user displays a top menu 301 first, guesses the location of a recording function in a hierarchical layer lower than the current hierarchical layer, and guesses menu item candidates to be selected. Subsequently, the user selects a menu item guessed as one of the candidates to make a transition to the immediately-below hierarchical layer (FIG. 6(1)). However, when the recording function is not provided in the transition destination, a return is made by pressing the Return button (FIG. 6(2)). Such selection and a press of the Return button are repeated until no more candidates are left (FIG. 6(3) to (4) to (5) to (6)).

The decision making time is the longest when the first selection is made because there is a need to judge the optimum item from among all the items as the selection candidates. Dwell times becomes shorter as the number of candidates decreases one by one in the trial using the candidates. In the case where the function desired by the user cannot be found in the respective menu items guessed in the earlier stage as the result of the trial, there is no clue for the next input action. This results in an increase in a decision making time.

This feature is observed in a dwell time until each input action is executed, and especially in a decision making time for determining the input action to be executed. Thus, the "confusion of not being able to find a function" can be detected based on the judgment standard that an increase is observed in a decision making time in the case where a user is confused.

For this reason, it is assumed in this embodiment that this "confusion of not being able to find a function" is reflected on: the decision making time which occurs at the time when a first transition to the menu is made; and on the subsequent decision making time which occurs at the time when a return to the menu from the menu in the lower hierarchical layer is made.

Subsequently, the following are measured: a dwell time which occurs at the time when the first transition to the menu is made and the subsequent dwell time which occurs at the time when the return to the menu from the menu in the lower hierarchical layer is made, and a decision making time in each dwell time is calculated by, for example, subtracting, a perception time (an eye movement time) and an operation time from the measured dwell time. According to the judgment standard that an increase is observed in the calculated decision making time, this state of "confusion of not being able to find a function" is detected.

In other words, in the case where the immediately-preceding input action is for making a transition to the current menu from another menu, whether the user is in a state of "confusion of not being able to find a function" or not is judged based on a judgment standard that an increase has been observed in a decision making time which occurs each time of a transition to the current menu In the process for generating a confusion judgment target input action sequence, when the immediately-preceding input action has been a "Return" input action sequence information is generated by extracting a decision making time which occurs at the time of a first transition and a subsequent return to the hierarchical layer from the lower hierarchical layer.

FIG. 7(c) is input action sequence information for judging a state of "confusion of not being able to find a function" generated based on the operation history information. The operation history information of FIG. 7(a) shows that: an input action indexed by 16 is currently being waited for in the display screen A; the immediately-preceding input action is "Down"; and the time needed for performing the input action is 15 seconds. A judgment on whether the user has been confused when the user pressed "Down" is desired to be made.

To make such judgment, it has only to extract a decision making time at the time of the first transition to the display screen and the decision making time at the time of the return to the hierarchical structure, and to generate input action sequence information for judgment. More specifically, such judgment can be made: by extracting operation information with time information related to the input action executed at the time of the input action 3 for making the first transition to the display screen A and related to the input actions executed at the time of input actions indexed by 10 and 15 each of which is for making a return to the hierarchical layer from the lower hierarchical layer (FIG. 7(b)); and by renumbering these (FIG. 7(c)).

Next, the "confusion due to a mismatch of a mental model" is described. When a user selects a display screen menu to display a desirable next menu but the displayed menu is different from the desirable menu, the confusion is the "confusion due to a mismatch of a mental model". This confusion is characterized in that a long decision making time is needed to understand these circumstances. More specifically, this confusion occurs when the user tries to select a menu item of "Date and time specification" expecting that the date and time specification menu are displayed, but input sources such as "BS" and "CS" appear. Since such unexpected menu appears, a long time is needed to make the next selection.

FIG. 8 specifically illustrates user's selection actions leading to the confused state assuming a task of "Recording reservation by specifying date and time". The user displays a top menu (display screen A) first, guesses the location of a recording reservation function in a hierarchical layer lower than the current hierarchical layer, and guesses menu item candidates to be selected. Here, it is assumed that: the user subsequently selects a "Reservation confirmation" menu; the menu which is display screen E is displayed; and that the user selects the "Date and time specification" menu in the immediately-below hierarchical layer.

The user tried to select the "Date and time specification" menu and expected that a display screen for the date and time specification is displayed, but actually, items of "BS", "CS", and "Ground wave" appear in the menu and a display screen for selecting video sources is outputted. Since an unexpected menu appears at this time, a long time is needed to understand these circumstances. Thus, this confusion is characterized in that a long time is needed to make the next selection, in other words, an increase is observed in the decision making time. It is considered that the unexpected result causes an increase in the decision making time.

In this embodiment, it is considered that the state of "confusion due to a mismatch of a mental model" is reflected on the decision making time which occurs when going down in the hierarchy by selecting a certain item in each display screen.

Dwell times which occurs at the time of going down in the hierarchy by selecting such item in each display screen are measured, a decision making time is calculated by subtracting a perception time (for example, an eye movement time) and an operation time from a measured dwell time, and the state of "confusion due to a mismatch of a mental model" is detected according to the judgment standard that an increase is observed in the calculated decision making time.

In other words, in the case where the immediately-preceding input action is for going down to the current menu from a higher hierarchical layer, whether the user is in a state of "confusion due to a mismatch of a mental model" or not is judged based on the judgment standard that an increase is observed in a decision making time which occurs in each of several menus on the way to the current menu.

In the process for generating a confusion judgment target input action sequence, when the immediately-preceding input action causes a transition to a specified lower hierarchical layer in sequential transitions to lower hierarchical layers without a transition to a higher hierarchical layer caused by an input of "Return" or the like in the sequential input actions, input action sequence information is generated by extracting the decision making times which occurred at the time of going down in the hierarchy.

FIG. 9(c) is input action sequence information for judging a state of "confusion due to a mismatch of a mental model" generated based on the operation history information shown in FIG. 9(a). The operation history information of FIG. 9(a) shows that the user displays a menu corresponding to display screen A which is the top menu by an input action indexed by 2, understands the menu in 20 seconds, and presses the operation button "Down". Subsequently, the user opens a display screen with an ID of E (for Reservation confirmation) by pressing "Down" as an input action indexed by 5. After taking time to understand the display screen E, the user opens a display screen with an ID of P (for Date and time specification) by pressing "Enter" as an input action indexed by 6. After taking a long time to understand the display screen P different from the expected menu, the user returns to the higher hierarchical layer by pressing the "Return" button as an input action indexed by 7 in 20 seconds. A judgment on whether the user has been confused when the user pressed "Return" is desired to be made.

To make such judgment, it has only to extract a decision making time until the next input action is executed in the lower hierarchical layer, and to generate input action sequence information for judgment. More specifically, such judgment can be made: by extracting operation information with time information related to the input actions indexed by 3, 6, and 7 (FIG. 9(b)), and replace these input action indices 3, 6, and 7 with input action sequence numbers starting with 1.

At this time, there is a need to normalize the decision making time according to the number of selection options displayed in each menu. This is because decision making times increase as the number of items increases. More specifically, a default decision making time for each item is considered to be 200 to 380 ms (subsumption relationship decision making time, page 91 of the earlier-identified Reference).

Thus, a time obtained by multiplying the difference in the number of items with 0.4 second is subtracted from the decision making time needed for each menu having a greater number of items when compared with the menu having the least number of items. For simplification, it is assumed here that all the menus have the same number of items.

Subsequently, "confusion in selecting a candidate" is described. When a user is confused to select a candidate while moving a cursor between candidates in search, this action is the "confusion in selecting a candidate".

FIG. 10 illustrates an example of user's actions leading to "confusion in selecting a candidate" at the time of "Recording" in detail. A user opens the top menu 301 (the cursor is on "On-air program"), and is thinking about a node to be reached from the second hierarchical layer.

The user moves a cursor to a "G code" expecting that "G code" probably lead to "Recording" first, doubts that the "G code" is a correct choice with the cursor on the "G code", and selects another menu of "Program guide" after a dwell time.

It is considered that these actions show that the user has been confused whether he/she should select "G code" to find the desired function or not because the user must have pressed "G code", without confusion. This confusion causes delay in decision making to take an action of selecting a candidate.

The "confusion in selecting a candidate" is a phenomenon where a user is confused to select an item in the same hierarchical layer while moving a cursor here and there. This confusion is characterized in that an increase is observed in a decision making time in the same hierarchical layer because of an increase in a dwell time due to confusion.

For this reason, it is assumed in this embodiment that the state of "confusion in selecting a candidate" is reflected on: the decision making time which occurs at the time when moving the cursor to a menu item in the same hierarchical layer.

This state of "confusion in selecting a candidate" is detected by grasping the tendency that an increase is observed in a decision making time focusing on the operation for moving the cursor in the same hierarchical layer.

In other words, when the immediately-preceding input action is an input action for remaining in the current menu, whether the user is in a state of "confusion in selecting a candidate" or not is judged based on the judgment standard that an increase has been observed in a decision making time which has occurred at the time of the execution of several input actions in the current menu.

FIG. 11(c) is input action sequence information for detecting a state of "confusion in selecting a candidate" generated based on the operation history information shown in FIG. 11(a). The focus is placed on input actions indexed by 10 to 13 executed in the same hierarchical layer among the operation history information in FIG. 11(a). The input action 10 is executed when a return from a lower hierarchical layer is made by a press of the "Return" button corresponding to an input action indexed by 9. First, the user moves his/her eyes to the items on the display screen, and decides whether each of the items should be selected or not. The user takes actions after decision making. In this case, the user stops at the input action 12 longer than the dwell time at the input actions 10 and 11, and proceeds to the input action 13 by pressing the "Down" button. At this time, the user is probably confused at the input action 12.

In the process for generating a confusion judgment target input action sequence, input action sequence information for detecting this state of "confusion in selecting a candidate" is generated by extracting a decision making time needed for the input actions executed in the same hierarchical layer. More specifically, such input action sequence information can be generated by extracting the operation information with time information related to the input actions 10 to 12 executed using "Up" and "Down" buttons in the same display screen (FIG. 11(b)), and renumbering these input actions (FIG. 11(c)).

As described above, different input action sequence information is generated in Step S210 to detect each of the following: "confusion of not being able to find a function", "confusion due to a mismatch of a mental model", and "confusion in selecting a candidate".

Next, a description is given of a confusion judgment process based on the input action sequence information generated in this way.

Confusion detection is performed in Step S211 based on the input action sequence information generated in Step S210. As in the above description given for the process for generating a confusion judgment target input action sequence, the feature that a decision making time increases in the case where confusion occurs can be observed in the input action sequence information for detecting the following: "confusion of not being able to find a function", "confusion due to a mismatch of a mental model", and "confusion in selecting a candidate". Thus, in this embodiment, a judgment that a user becomes confused is made when a decision making time indicated by input action sequence information increases for each of the three categories of confusion.

A judgment based on an increase in a decision making time is made by comparing a decision making time needed for a current input action on which the judgment is made with a threshold determined based on the decision making times calculated from the dwell times in a sequence of input actions executed by the user. When the input action sequence number is n, the threshold for judging whether the decision making time at the n-th input action shows that the user has been confused or not is $\theta_n$, and the decision making time at the n−1st input action is $A_{n-1}$, the confusion judgment can be defined by the following Expression 1.

$$\theta_n = A_{n-1}, \theta_1 = 20 \quad \text{(Expression 1)}$$

In this example, $\theta_1$ is the initial value, and $\theta_n$ is 20. Note that the value of $\theta_1$ is not limited to this, and it has only to set a decision making time clearly showing that a general user becomes confused.

Confusion detection becomes possible using this Expression for judgment in the following manner. When there is no confusion, a decision making time indicated by input action sequence information does not increase. Without confusion, the current decision making time exceeding the immediately-preceding decision making time is never calculated. In contrast, when the current decision making time exceeding the immediately-preceding decision making time is calculated, this probably shows an occurrence of confusion at the time point. Thus, an increase in a decision making time can be detected using, as a threshold, the decision making time for the immediately-preceding input action, in the confusion judgment for the n-th input action.

FIG. 12(a) specifically illustrates variations in the values of $\theta$ and A with respect to the input action sequence information shown in FIG. 7(c). FIG. 7(c) is an example where a user is searching for a reservation function while repeatedly moving between the first hierarchical layer and the second hierarchical layer and confusion occurred before an input action indexed by 15 (an input action sequence numbered 3). According to the approach, it is shown that: there is no confusion at the time points of n=1 and 2 as indicated by $\theta_n > A_n$, and thus no confusion is detected; and there is confusion at the time point of n=3 as indicated by $\theta_3 < A_3$, and thus the confusion is detected.

In addition, an advantageous effect can be achieved through a consideration of several histories by defining the threshold in the detection method as shown in Expression 2, and by defining f as shown in Expression 3 in the following Expressions.

$$\theta_n = f(\theta_{n-1}, A_{n-1}), \theta_1 = 20 \quad \text{(Expression 2)}$$

$$f(\theta_{n-1}, A_{n-1}) = (\theta_{n-1} + A_{n-1})/2 \quad \text{(Expression 3)}$$

These definitions make it possible to suppress a sharp variation in the threshold $\theta$, as shown in FIG. 12(b). This makes it possible to perform confusion detection with a sufficient time range in the judgment on the necessity of suitable trouble support. More specifically, it becomes possible to achieve the confusion detection method which reduces an emotional discomfort factor that confusion detection is excessively performed, by taking into account differences in time to operate devices which inevitably arise among individual operators.

In addition, the same advantageous effect can be achieved by averaging movement of t-number of samples by defining the threshold as shown below.

$$\theta_n = \text{Mean}(A_{n-t}, A_{n-t+1}, \ldots, A_{n-1}) \quad \text{(Expression 4)}$$

Confusion judgment adapted to individual differences is described next.

Figure 13:
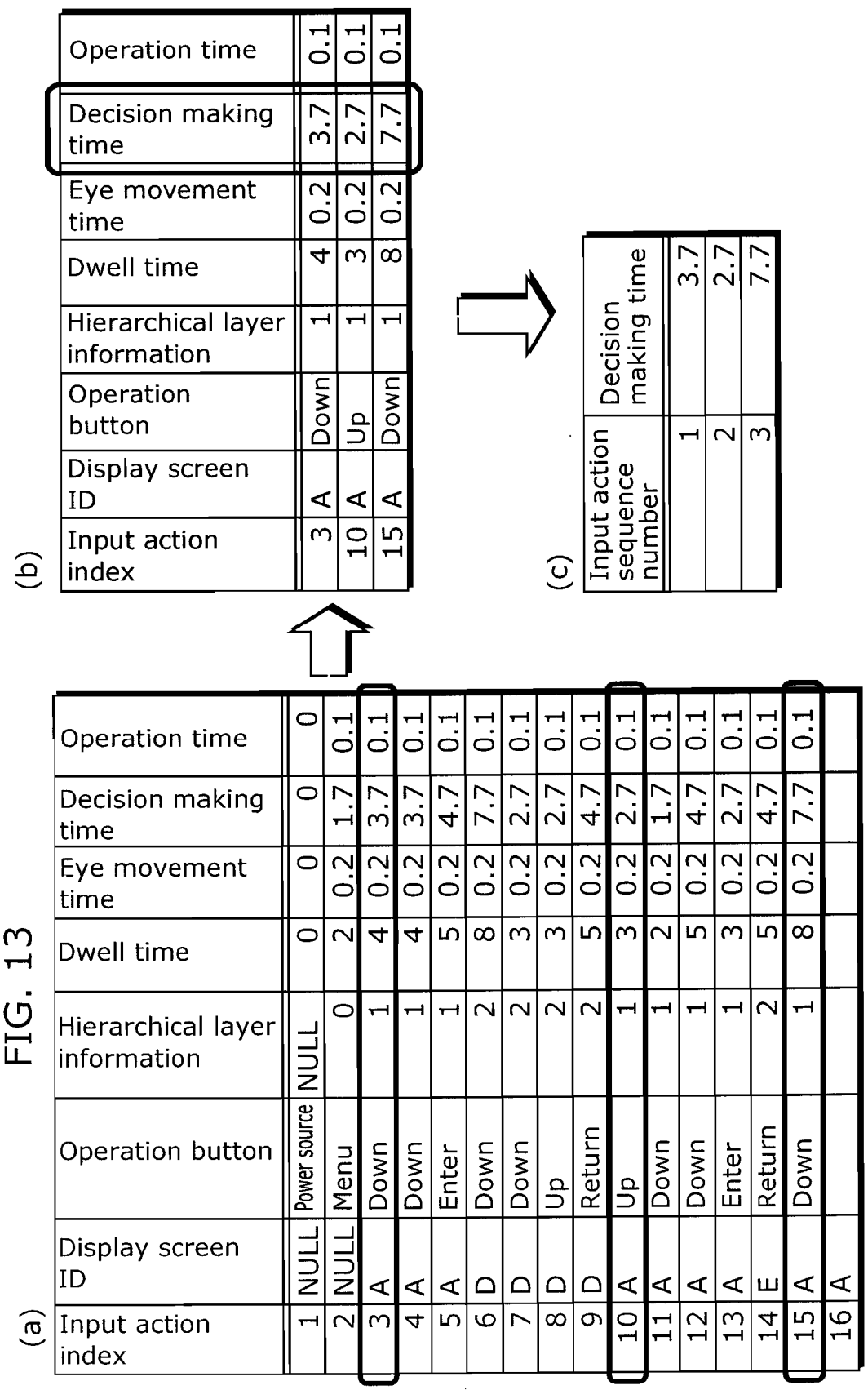
FIGS. 13 (a), (b), and (c) is a diagram showing another example of an input action sequence where confusion in selecting a candidate has occurred.

FIG. 13 shows input action sequence information related to a user who is skilled and quick in operating information devices. For simplification, it is assumed that identical input actions are executed but a dwell time is different for each operation.

Likewise the description given with reference to FIG. 7, input action sequence information in FIG. 13(c) is calculated. When confusion detection based on Expression 1 and Expression 2 is performed, variations of $\theta_n$ and $A_n$ are as shown in FIGS. 12(c) and (d), and an occurrence of confusion at the time of an input action sequence 3 can be as in the earlier description.

Comparison is made here. In the case where confusion detection is performed by employing a conventional approach of comparing each dwell time with a predetermined threshold and making a judgment on the confusion detection, $\theta$ must be 7.7 seconds as clear from FIG. 13(c) in order to detect an occurrence of confusion at the time of the input action sequence 3. However, when $\theta$ is 7.7 seconds, confusion is erroneously detected at the time of an input action sequence 1 in the case shown in FIG. 7(c).

In contrast, this approach, in which the judgment standard that an increase is observed in a decision making time is used, makes it possible to perform accurate confusion detection adapted to individual differences in operation speed depending on the skill of each user in using information appliances, the perception ability or speed of the user, and the like.

Next, a specific example is given of confusion due to a mismatch of a mental model shown in FIG. 9. FIG. 9 shows confusion which occurs when an unexpected display screen P appears at the time of an input action 7 (input action sequence 3) is executed.

According to a method based on Expression 1, $\theta_3$ is 7.7 and $A_3$ is 19.7, and $\theta_3$ is smaller than $A_3$, and thus confusion is detected. Likewise, according to a method based on Expression 2, $\theta_3$ is 11.3 and $A_3$ is 19.7, and $\theta_3$ is smaller than $A_3$, and thus confusion is detected.

Figure 14:
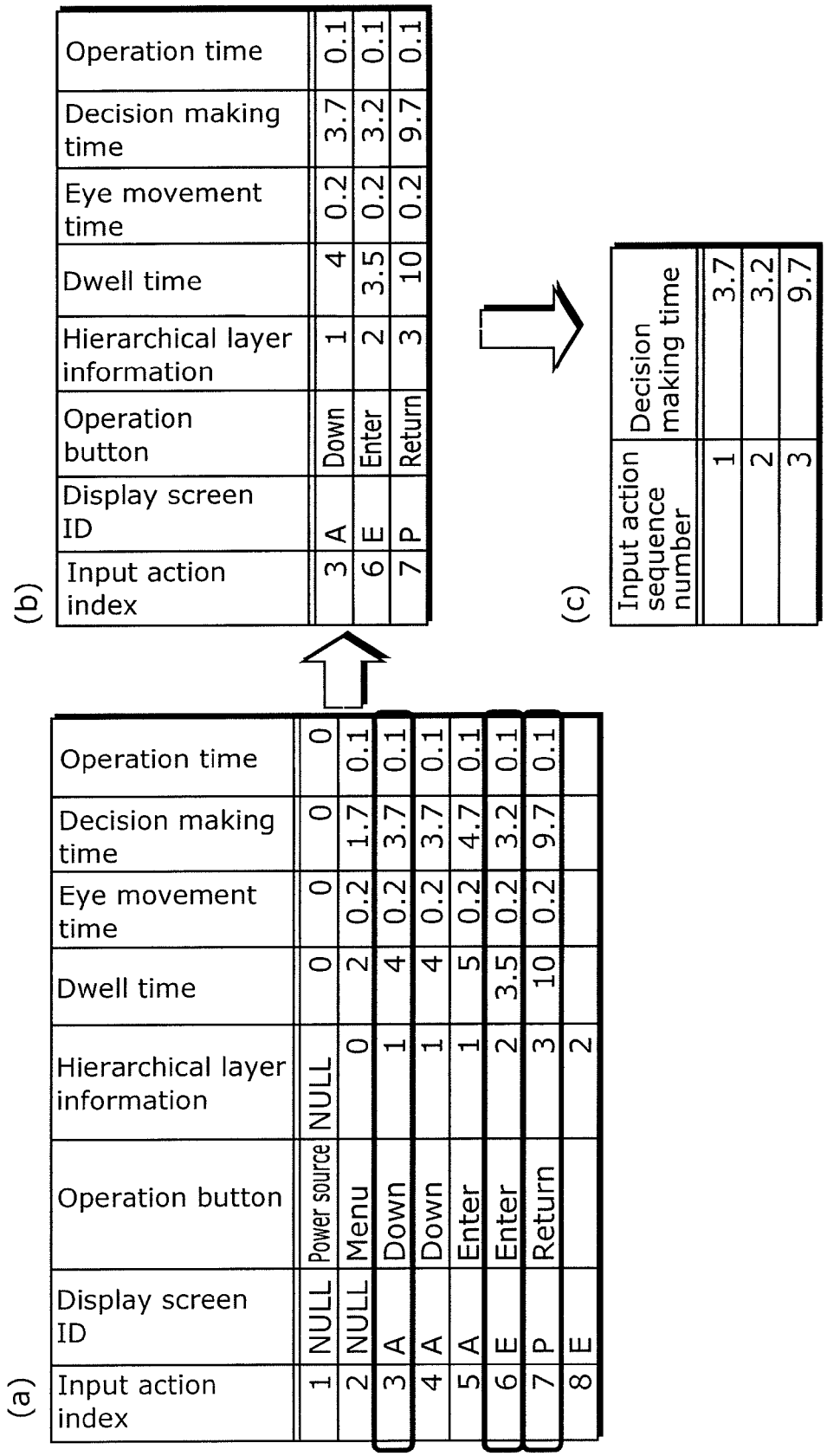
FIGS. 14 (a), (b), and (c) is a diagram showing another example of an input action sequence where confusion due to a mismatch of a mental model has occurred.

Meanwhile, FIG. 14 shows input action sequence information assumed for a user who is skilled and quick in device operation. Likewise, it is assumed that confusion which occurs when the unexpected display screen P appears at the time of an input action 7 (input action sequence 3) is executed.

According to a method based on Expression 1, $\theta_3$ is 3.2 and $A_3$ is 9.7, and $\theta_3$ is smaller than $A_3$, and thus confusion is detected. Likewise, according to a method based on Expression 2, $\theta_3$ is 6.1 and $A_3$ is 9.7, and $\theta_3$ is smaller than $A_3$, and thus confusion is detected.

Comparison is made here. In the case of employing the approach of making a judgment for confusion detection based on a predefined threshold according to a conventional approach, $\theta$ must be 10 seconds as clear from FIG. 14. However, when $\theta$ is 10 seconds, confusion is erroneously detected in an input action sequence numbered 1 in the case of FIG. 9.

In contrast, the approach of the present invention in which variation in decision making time is focused on makes it possible to perform confusion detection adapted to individual differences in operation speed depending on the skill of each user in using information appliances, the perception ability or speed of the user, and the like, by focusing on an increase in a decision making time, without entailing the above-described problems.

Next, a specific example is given of confusion which occurs in selecting candidate, shown in FIG. 11. FIG. 11 is an example where confusion occurs before the input action 12 (the input action sequence 3) between the input actions 10 and 13 executed in the same hierarchical layer.

According to the method based on Expression 1, $\theta_3$ is 1.7 and $A_3$ is 9.7, and $\theta_3$ is smaller than $A_3$, and thus confusion is detected.

Figure 15:
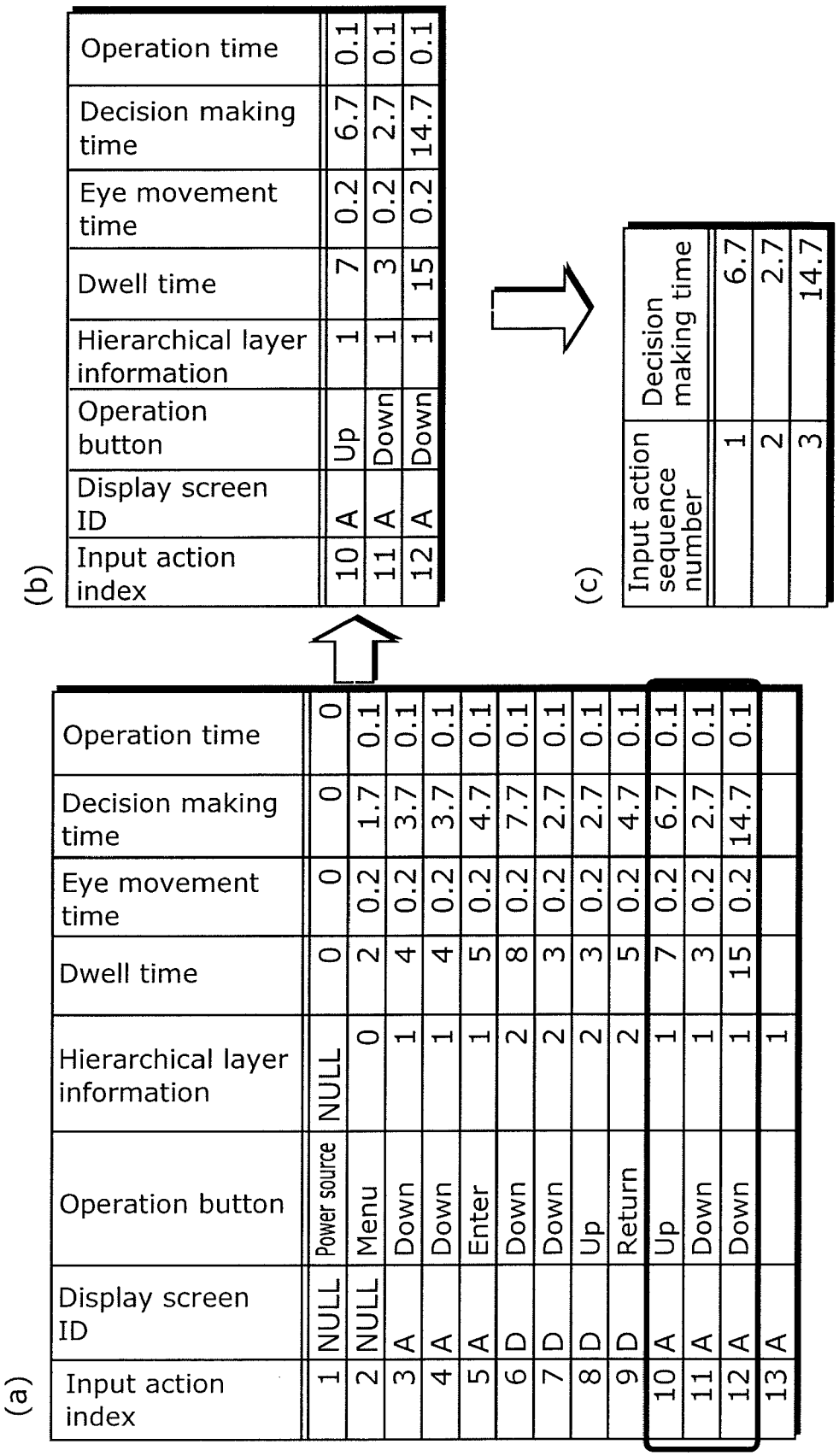
FIGS. 15 (a), (b), and (c) is a diagram showing another example of an input action sequence where confusion in selecting a candidate has occurred.

In addition, FIG. 15 shows an example where a user skilled in operation is confused before the input action 12 (the input action sequence 3) between the input actions 10 and 13 executed in the same hierarchical layer. In this case, according to the method based on Expression 1, $\theta_3$ is 2.7 and $A_3$ is 14.7, and $\theta_3$ is smaller than $A_3$, and thus confusion is detected.

As described above, the confused state judging unit 107 in this embodiment determines a threshold for decision making time from a dwell time measured for at least one input action in an input action sequence, and judges that the user has been confused when the decision making time for a current input action is greater than the determined threshold. Therefore, the confused state judging unit 107 is capable of performing confusion detection adapted to individual differences in operation speed depending on the skill of each user in using information appliances, the perception ability or speed of the user, and the like in all the cases of "confusion of not being able to find a function", "confusion due to a mismatch of a mental model", and "confusion in selecting a candidate".

Here, it is effective that the confused state judging unit 107 determines a threshold for dwell time from a dwell time measured for at least one input action, and judges that the user has been confused when the dwell time for a current input action is greater than the determined threshold.

This is because it is possible to judge an increase in a decision making time using an increase in a dwell time by approximating the decision making time to the dwell time when the eye movement time (perception time) and operation time for each input action are approximated to fixed values and when the eye movement time and operation time occupy small portions of the dwell time.

Next, detailed descriptions are given of a process for selecting an operation support method and a process for operation support executed in Step S213 and Step S214, respectively.

In the case of "confusion of not being able to find a function", a possible operation support is to provide a guidance for finding a function. In the case of "confusion due to a mismatch of a mental model", a possible operation support is to provide a description of a function for solving the mismatch. In the case of "confusion in selecting a candidate", a possible operation support is to provide a description of each menu item.

Desirable operation support is considered in this way depending on confusion categories. When a judgment that the user is confused is made in Step S213, suitable operation support method is selected from the confusion and operation support association table storage unit 108 shown in FIG. 16, and suitable support is determined. Here, it is assumed that confusion and operation support association information indicating desirable operation support according to each confusion category is stored in a corresponding support method column in the confusion and operation support association table storage unit 108.

Next, operation support is provided in Step S214. For example, a guidance is provided as operation support in the case of "confusion of not being able to find a function" is provided by urging the user to input a keyword and narrowing down to a target function interactively according to support information for each confusion category stored in the confusion and operation support association table storage unit 108. Additionally, the use of an information search technology is also effective.

Likewise, in the case of "confusion due to a mismatch of a mental model", a description of a function is provided as operation support with reference to the confusion and operation support association table storage unit 108. For example, in the case shown in FIG. 8, an effective approach for solving user's confusion is to provide a description of a function and an operation procedure such as "Please specify a source of a program to be reserved before specifying the recording date and time of the program".

Likewise, in the case of "confusion in selecting a candidate", descriptions of items are provided as operation support with reference to the confusion and operation support association table storage unit 108. For example, in the case shown in FIG. 10, user's confusion can be solved by providing a description such as "A G code allows a user to make a reservation recording of a program by specifying the code of the program."

According to the above-described structure, it is possible to provide a device which is capable of: judging confused state based on a user's decision making time by focusing on temporal variation in decision making time in operation history of the user; properly detecting the user's confused state without being affected by differences among individuals or differences in circumstances; and providing suitable user support by providing operation support adapted to the detected confused states.

The input means in this embodiment is a simple remote controller 401 as shown in FIG. 3, but it should be noted that the input means may be a speech recognition device, a mouse, a keyboard, a touch panel, and the like. Even when a user goes down to a menu layer or comes up from the menu layer in a hierarchy, or the user goes down to a menu layer and stops at the menu layer, "confusion of not being able to find a function", "confusion due to a mismatch of a mental model", and "confusion in selecting a candidate" can be detected as in the above descriptions, as a matter of course.

Here, only input actions for selection are received through a touch panel, and a concept of cursor movement is not considered. In other words, since a cursor movement in each menu cannot be detected, it is impossible to detect "confusion in selecting a candidate" cannot be detected based on cursor movement. However, "confusion of not being able to find a function" and "confusion due to a mismatch of a mental model" can be detected by measuring, as a decision making time, the time obtained by subtracting a time needed for operating a touch panel (for example, 258 ms, see the earlier-identified Reference, page 92) and an eye movement time from a dwell time needed to make a selection.

Likewise, in the case of using a speech recognition device or a mouse to input a selected option, it has only to subtract, from a dwell time, an eye movement time and either a time needed to start utterance or a response time needed to move the mouse.

Here, a time obtained by subtracting, from the dwell time, eye movement time and operation time is regarded as a decision making time. However, detecting confusion by regarding a decision making time as being approximately the same as a dwell time is also effective although no embodiment is provided for this case. This is because an eye movement time and an operation time are almost constant and short compared with a decision making time.

As to support for "confusion in selecting a candidate", the use of an interface for selecting a desirable program or music in a program list in server-broadcasting or a music list in music distribution service makes it possible to provide, to a user, supplemental information such as descriptions of the candidate program or music on which the user stops the cursor. This is a very effective support to a user.

This embodiment shows an example where the user support device is applied to DVD recorders or televisions, but the user support device is available for confusion detection and user support in operating personal computers and in searching information on webpage with hierarchical links such as internet portal sites.

Further, this user support device may be extended so as to be a user support system which enables a user to obtain support information from a server device via a network. Examples of such support information include operation manuals and help messages to be presented to users.

Figure 17:
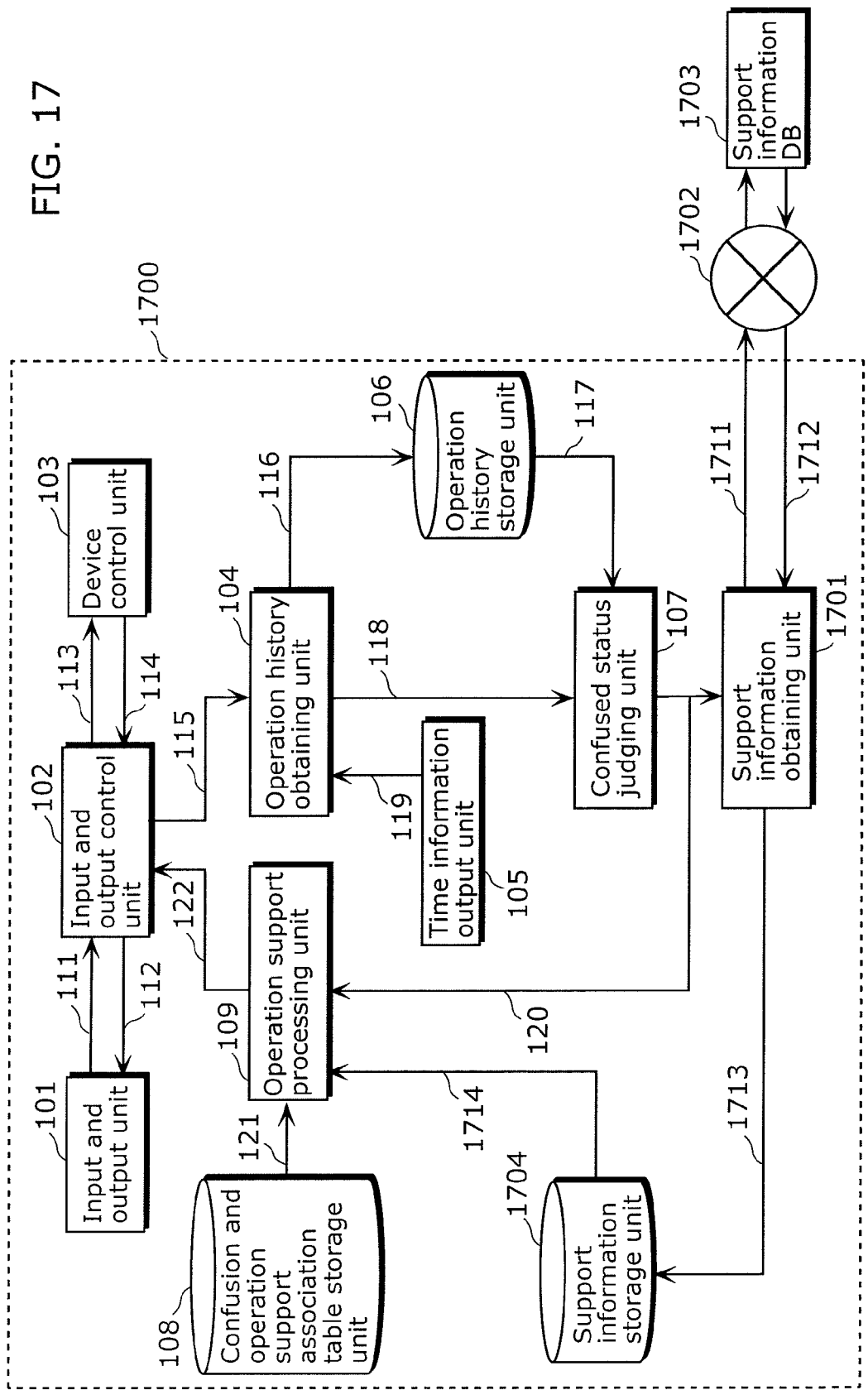
FIG. 17 is a diagram showing the structure of a user support system in the first embodiment of the present invention.

FIG. 17 is a block diagram showing an example of the functional structure of such user support system. This user support system is configured by adding a support information obtaining unit 1701, a support information storage unit 1704, a network 1702, and a support information DB 1703 to the user support device (see FIG. 1) described in the first embodiment.

In FIG. 17, the inside of dotted lines represents the user support device 1700 incorporated in a DVD recorder, television, or the like.

The confused state judging unit 107 outputs a confusion detection signal 120 to the operation support processing unit 109 and the support information obtaining unit 1701. The support information obtaining unit 1701 transmits a detection condition signal 1711 for searching for support information adapted to a confused state indicated by the confusion detection signal 120 to the support information DB 1703 via the network 1702. The support information DB 1703 transmits a search result signal 1712 indicating the searched-out support information to the support information obtaining unit 1701.

The support information obtaining unit 1701 transmits a support information signal 1713 indicating the transmitted support information and the corresponding confused state to the support information storage unit 1704. The support information and confused state are stored in association with each other in the support information storage unit 1704.

The operation support processing unit 109 receives the confusion detection signal 120 from the confused state judging unit 107, and presents the support information suitable for the confused state indicated by the confusion detection signal 120 with reference to the support information storage unit 1704 to the user through the input and output control unit 102 and the input and output unit 101.

Considering that the user support device 1700 is incorporated in an appliance such as a DVD recorder and a television with comparatively strict restrictions on the sizes and cost, it is not always a good idea to hold support information suitable for numerous possible confused states in the user support device 1700.

For this reason, in such user support system, it is preferable that: support information suitable for numerous possible confused states are prepared in an external server and used via a network; and that support information suitable for an experienced confused state are held inside the user support device so as to be presented timely when the user gets into the same confused state.

Note that a confused state judgment may be made by the external server outside the user support system. In this case, the confused state judging unit 107 is included in the external server instead of the user support device 1700. The user support device 1700 has only to transmit input action sequence information to the external server in order to obtain suitable support information and present it to the user.

Second Embodiment

A second embodiment describes usability evaluation based on confusion detection of the present invention.

Figure 18:
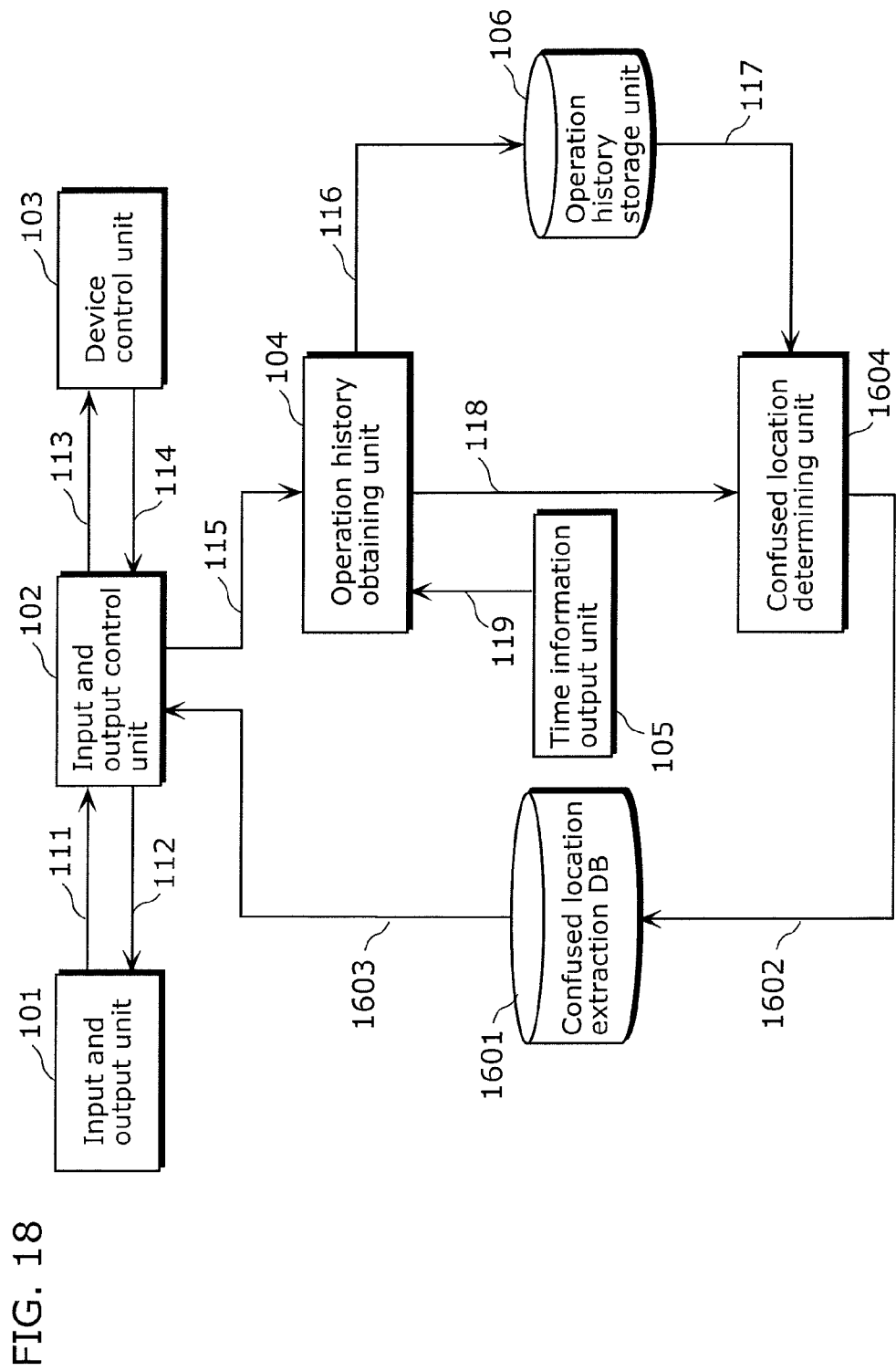
FIG. 18 is a diagram showing the structure of a usability evaluation device in a second embodiment of the present invention.

FIG. 18 is a diagram showing the structure of a usability evaluation device which performs confusion detection of the second embodiment according to the present invention. Descriptions are omitted for structural elements included also in the 1 user support device which performs the confusion detection of FIG. 1.

A confused location judging unit 1604 has functions of generating input action sequence information based on an operation history information signal 117, judging a confused state based on the input action sequence information, and outputting judgment results as to what is the ID of the display screen at which confusion has occurred and into which category the confusion is classified as a confused location detection signal 1602. Here, the same method as in the first embodiment is used to generate input action sequence information and judge confused states.

A confused location extraction DB 1601 is for storing results of judgment made by the confused location judging unit 1604. As shown in FIG. 19, display screen IDs, confusion categories, and confusion detection frequency are stored in association with each other in the confused location extraction DB 1601. The input and output control unit 102 has functions of receiving a confused location judgment result signal 1603 and outputting the evaluation result to the input and output unit 101.

In FIG. 18, the confused location judging unit 1604 is an example of a confused state judging unit; the confused location extraction DB 1601 is an example of a confusion judgment result accumulation unit; and the input and output control unit 102 and the input and output unit 101 are examples of a confusion judgment result display unit.

Figure 20:
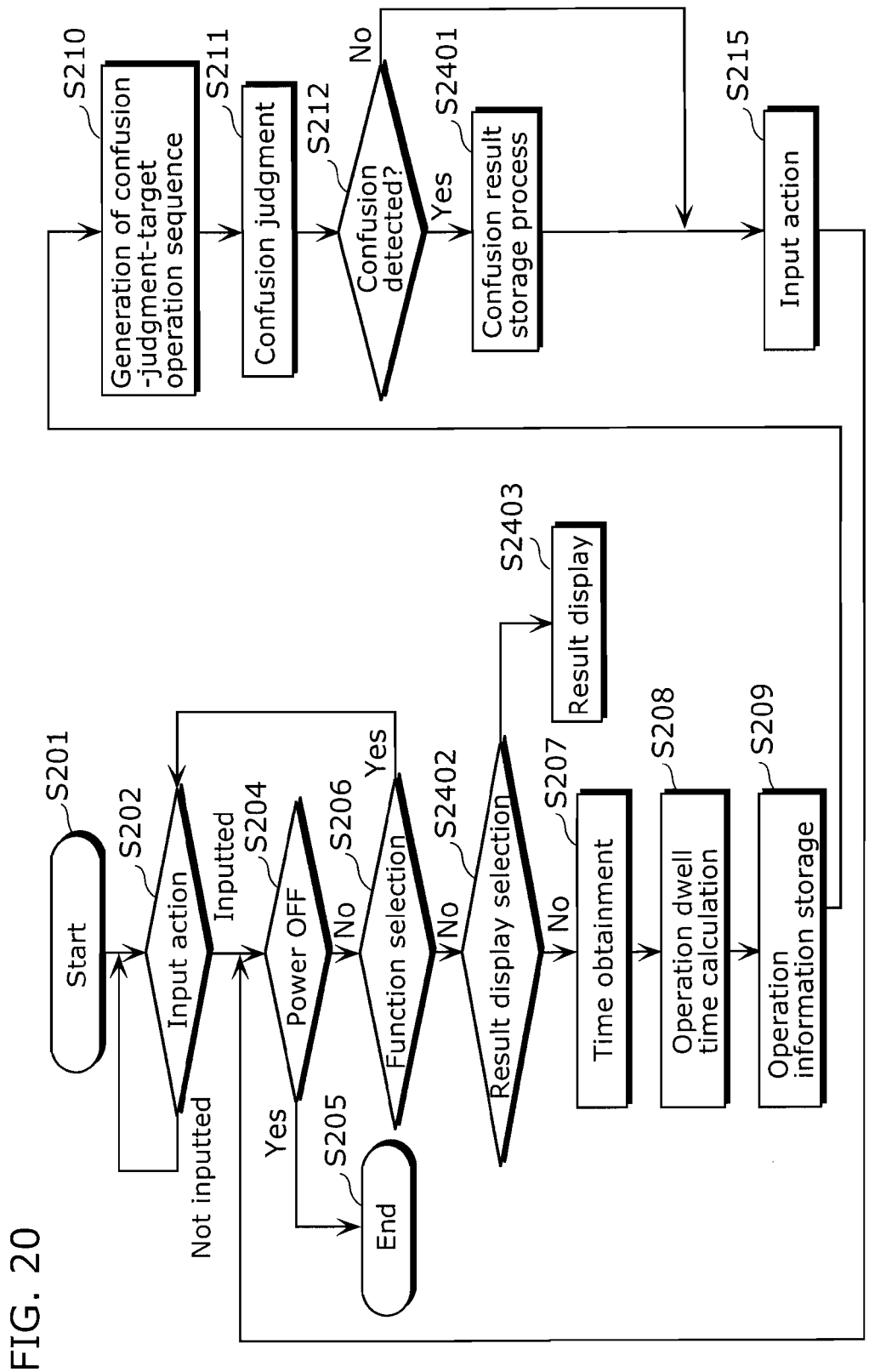
FIG. 20 is a flowchart showing the processing executed by the usability evaluation device in the second embodiment.

A description is given of operations in the usability evaluation method in which the confusion detection according to the present invention is executed with reference to the flowchart shown in FIG. 20. The same descriptions illustrating confusion detection in the user support method provided with reference to FIG. 4 are omitted.

In the case where confusion is detected by the confused location judging unit 1604 in Step S212, a transition to Step S2401 is made.

In Step S2401, based on the ID of the display screen which is a location, at which confusion has occurred, outputted by the confused location judging unit 1604 and the confused location detection signal 1602 indicating the category of the confusion, the frequency associated with the display screen ID and the confusion category in the confused location extraction DB is updated. Specifically, the frequency is incremented by 1.

In the case where it is judged that the input and output control unit 102 has selected display of results, a transition to Step S2403 is made.

Figure 21:
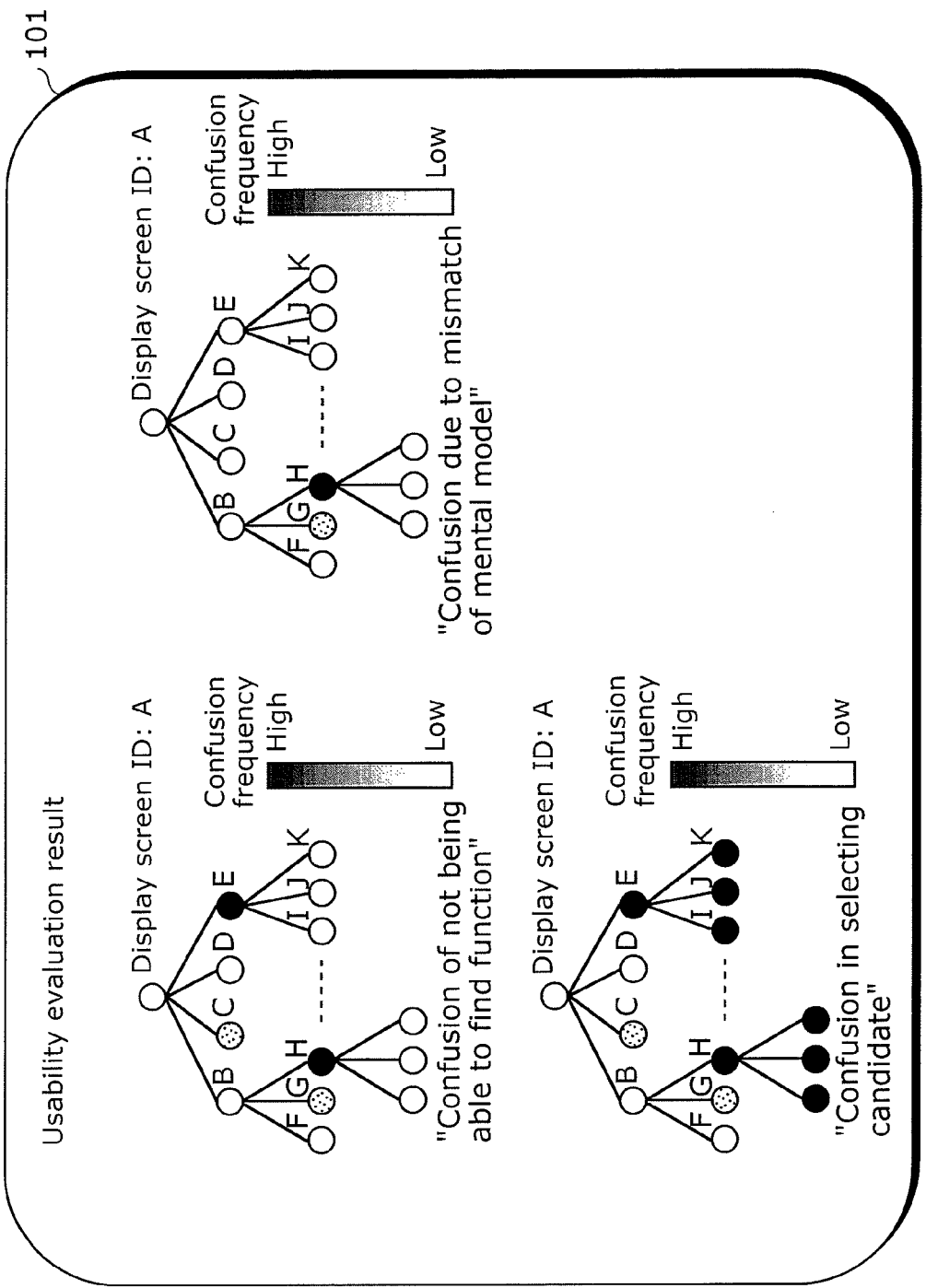
FIG. 21 is a diagram showing an example of a display screen, of the usability evaluation device, on which evaluation results are outputted.

In Step S2403, the input and output control unit 102 clearly displays, for each confusion factor, the locations corresponding to menu layers at which confusion frequently occurs in the hierarchy, based on the confused location judgment result signal 1603. FIG. 21 shows an example of an effective method for listing locations and frequency of confusion by displaying a menu tree for each confusion category on the display screen, normalizing and coloring confused locations based on, for example, the maximum value of frequency. In the case where all the menu layers cannot be displayed on the screen display because of size restriction, only confused locations may be highlighted in display, or locations may be presented in form of a table in which only confused locations may be colored.

Third Embodiment

Figure 22:
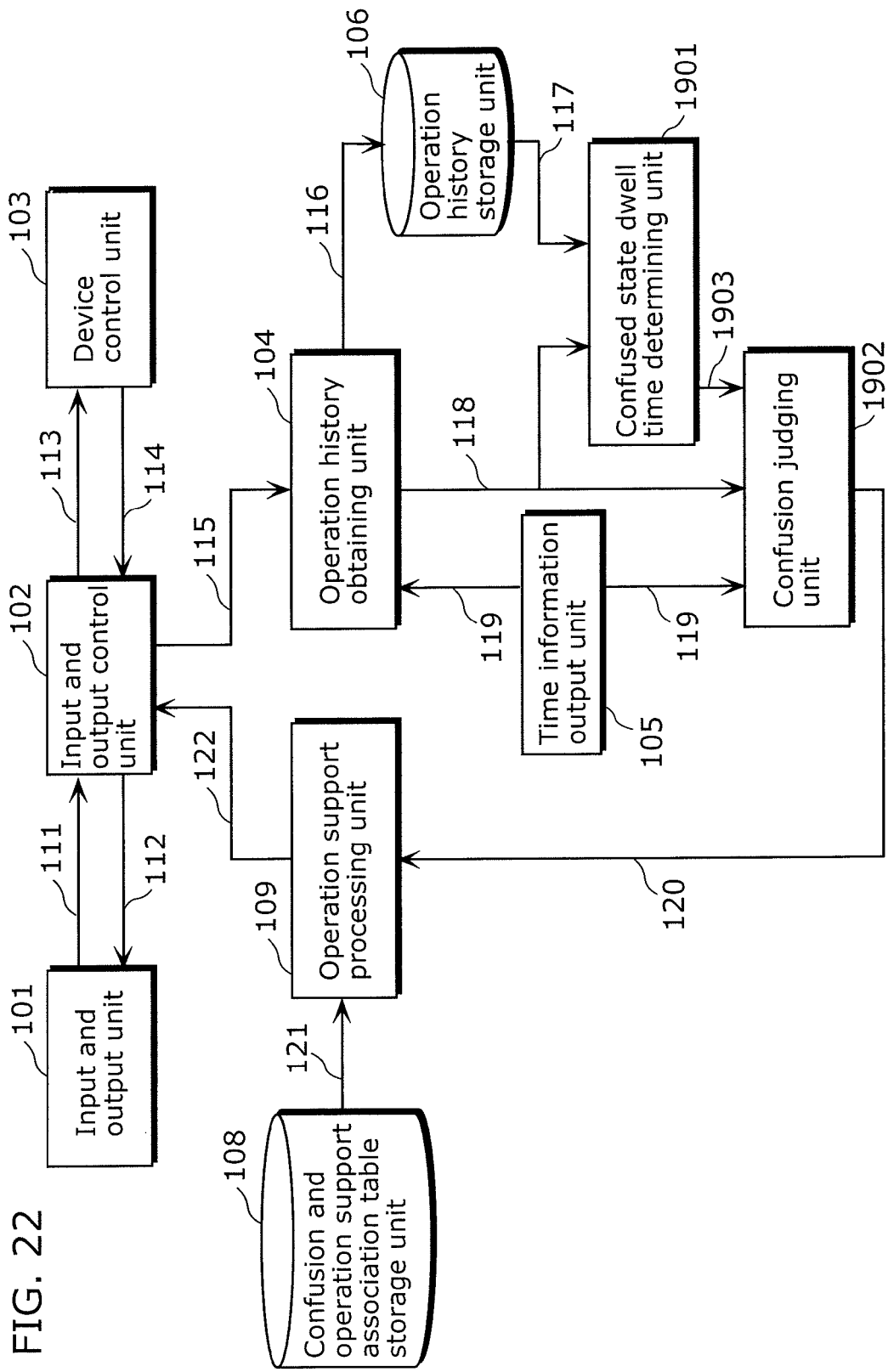
FIG. 22 is a diagram showing the structure of the user support device in a third embodiment of the present invention.

FIG. 22 is a diagram showing the structure of the user support device which performs confusion detection of a third embodiment according to the present invention. This embodiment makes it possible to predict a decision making time which occurs at the time of confusion, to immediately detect confusion when a dwell time exceeds the predicted time, and to immediately start user support.

In FIG. 22, the same structural elements in FIG. 1 are assigned with the same numeral references, and descriptions for these are omitted.

A confused state dwell time determining unit 1901 receives an operation history information signal 117 indicating operation history, and device operation timing notification signal 118 indicating the timing of executed input action, and determines a threshold α for a decision making time to judge that confusion has occurred in the case where the decision making time until the next operation starts is α or more. Subsequently, the dwell time determining unit 1901 outputs the result as a confused state dwell time signal 1903 to the confusion judging unit 1902.

The confusion judging unit 1902 has functions for monitoring a confused state by calculating a dwell time with reference to a time information signal 119, and judging confusion based on the confused state dwell time signal 1903 indicating the threshold α for a decision making time to judge that confusion has occurred.

Figure 23:
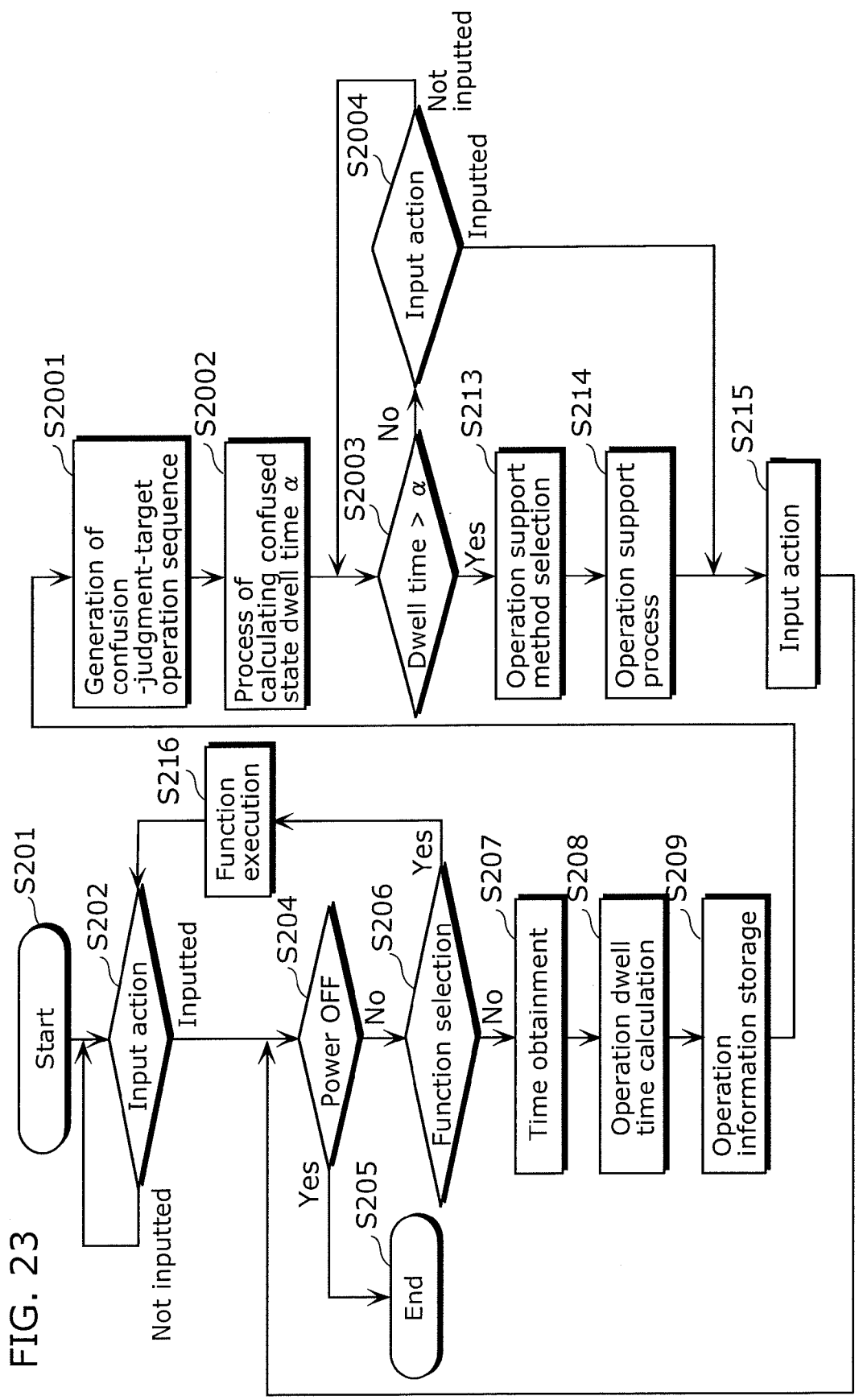
FIG. 23 is a flowchart showing the processing of the user support device in the third embodiment.

A description is given of operations executed in a user support method based on confusion detection according to the present invention structured like this with reference to the flowchart of FIG. 23. As in the first embodiment, it is assumed that a user operates a DVD player having an interface of a menu hierarchy shown in FIG. 2 using an input device shown in FIG. 3. Descriptions for the same steps in the flowchart in FIG. 4 are omitted. In addition, the following descriptions are given assuming that the user wishes to record a currently on-air program and has executed input actions shown in FIG. 24(*a*). Assume that a "Return" button is pressed as an input action indexed by 14, and an input to be an input action indexed by 15 is waited for with a display screen with an ID of B displayed.

Steps up to Step S209 including storing the category of a current input action and hierarchy information are the same as those in the first embodiment. In Step S2001, the confused state dwell time determining unit 1901 generates input action sequence information according to the three conditions shown below. This embodiment differs from the first embodiment in that a judgment is made as to whether a sequence to be inputted causes confusion or not, whereas the input action sequence information in the first embodiment indicates a result of a judgment made as to whether a sequence inputted has resulted in confusion or not.

Condition (1): An Immediately-Preceding Input Action is "Return" to go Up in the Hierarchy In this case, "confusion of not being able to find a function" may occur. As in the case of FIG. 7 in the first embodiment, input action sequence information is generated by extracting the input action executed in a first transition to a current hierarchical layer and the input action executed to return to the current hierarchical layer from a lower hierarchical layer, from the operation history storage unit 106 as a partial sequence on which a decision making time is reflected.

Condition (2): An Immediately-Preceding Input Action is "Enter" to go Down in the Hierarchy In this case, "confusion due to a mismatch of a mental model" may occur. In general, candidates are narrowed down as a user goes down in the hierarchy. Thus, a decision making time in a lower layer should become shorter than the decision making time at the time of a first transition to a higher hierarchical layer. For this reason, input action sequence information is generated by extracting the decision making time at the time of a first transition to each hierarchical layer. At this time, there is a need to perform processing depending on the number of items to be displayed on menus as in the first embodiment. An example of such processing includes normalizing a decision making time by, for example, subtracting, from a dwell time, an average decision making time depending on the number of items (a typical decision making time is obtained by, for example, multiplexing the number of menu items exceeding the least number of menu items by a decision making time 400 ms per item, the earlier-identified Reference, page 91). For simplification, the number of items is assumed to be identical here.

Condition (3): An Immediately-Preceding Input Action Corresponds to "Up" or "Down" Executed in the Same Display Screen In this case, "confusion in selecting a candidate" may occur, and thus input action sequence information is generated by extracting input actions executed in the same display screen.

Figure 24:
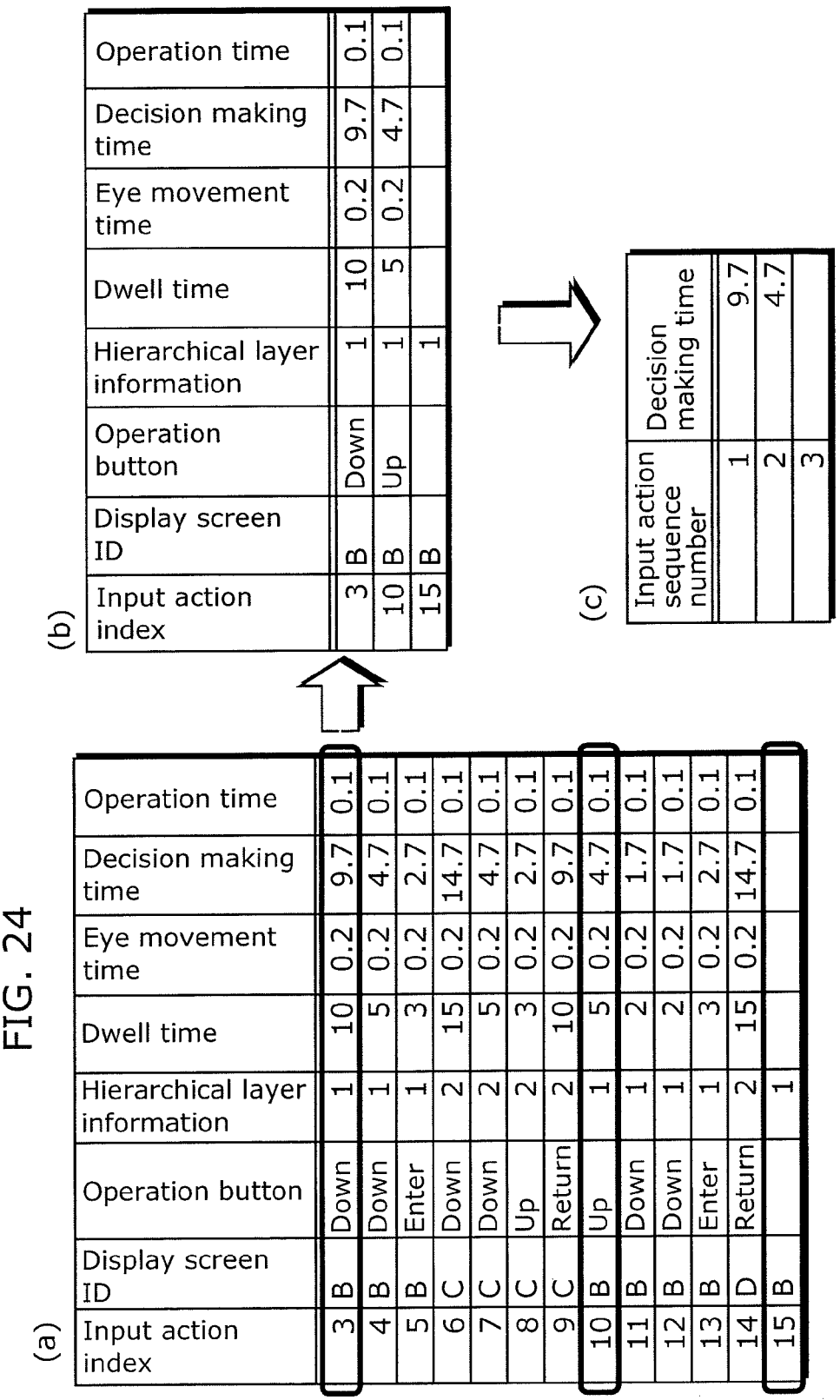
FIGS. 24 (a), (b), and (c) is a diagram showing an example of input action sequence information for judging confusion of not being able to find a function in the third embodiment.

Here, condition (1) is satisfied because the immediately-preceding input action is "Return", and thus the confused state dwell time determining unit 1901 generates input action sequence information for making a judgment on confusion. FIG. 24 shows how to generate input action sequence information. The following are extracted from FIG. 24(*a*): the input action 3 executed at the timing of a first transition to the display screen B; and the input actions 10 and 15 each of which is executed at the timing of a return to the display screen B from a lower hierarchical layer (display screen B, C, D, E, F, or G). Subsequently, input action sequence information is reconstructed as shown in FIG. 24(*c*).

Next, in Step S2002, a threshold α for a decision making time is calculated for a dwell time which occurs at a current input action (indexed by 15) so that the threshold α is used to judge that confusion has occurred. Since such judgment is made when a decision making time exceeds the decision making time threshold α, the threshold α is equivalent to $\theta_n$ used in the first embodiment. Thus, the threshold α can be calculated by regarding $\theta_n$ in Expression 1 as α. In other words, a threshold α may be determined based on the immediately-preceding decision making time. Here, when input action sequence information is Bj, the threshold α for an input action sequence i can be represented as follows:

$$\alpha = \beta_{i-1} \quad \text{(Expression 5)}$$

Figure 25:
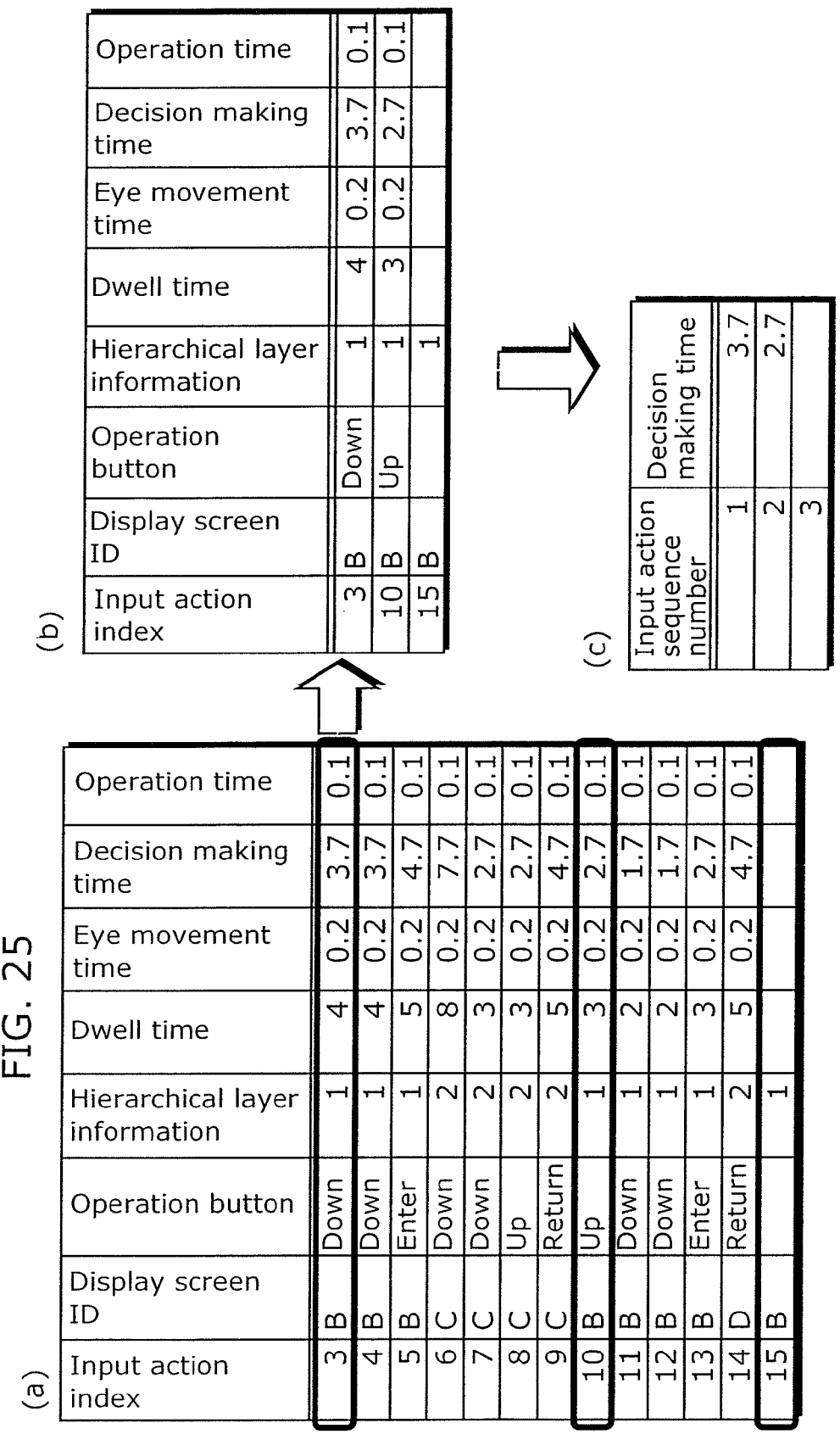
FIGS. 25 (a), (b), and (c) is a diagram showing another example of input action sequence information for judging confusion of not being able to find a function in the third embodiment.
Figure 26:
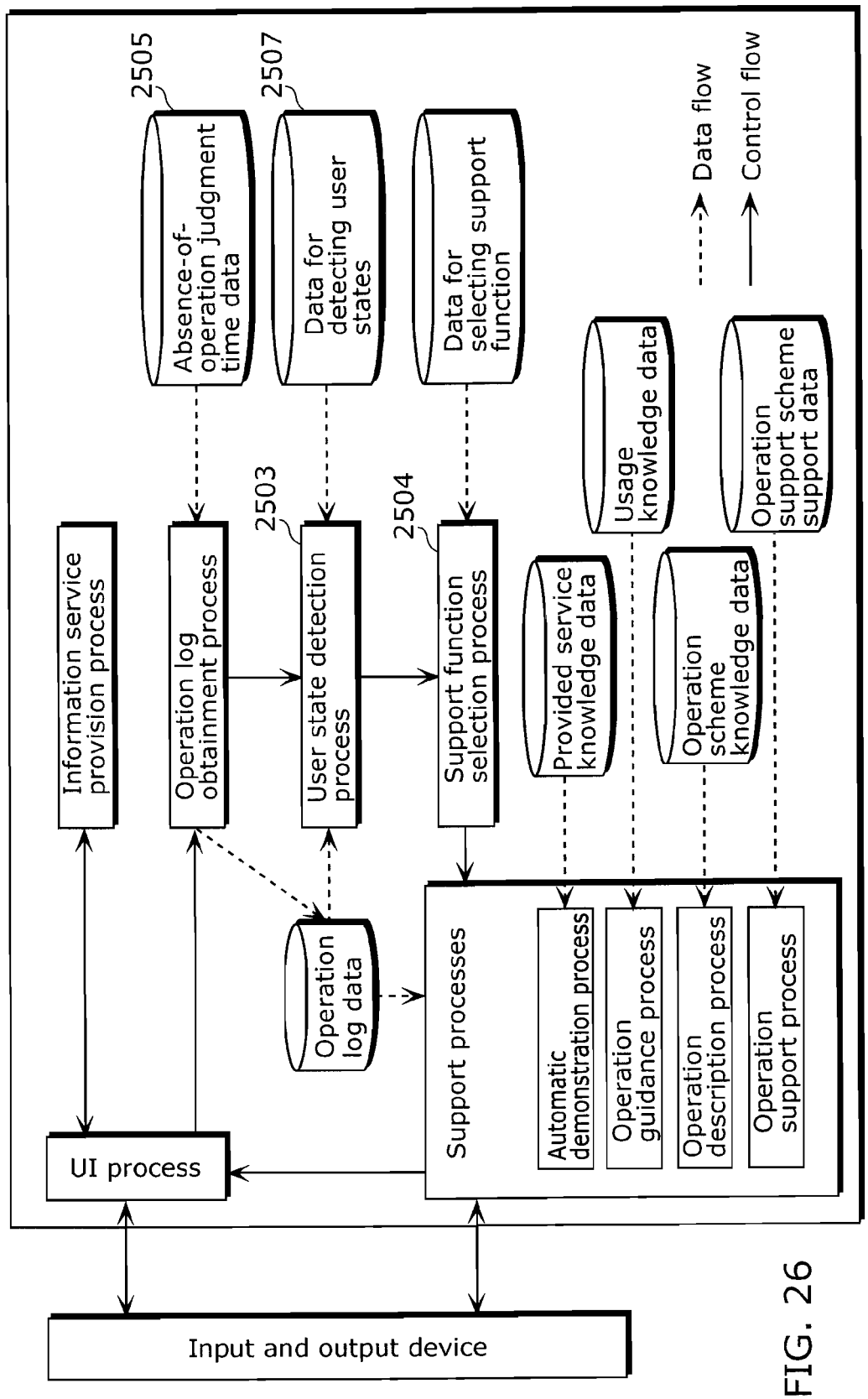
FIG. 26 is a diagram showing a conventional user support device.

For example, when an operation dwell time $B_1$ is 9.7 seconds and $B_2$ is 4.7 seconds, the decision making time threshold α for the input action sequence 3 is calculated as being 4.7 seconds. As in the description for the first embodiment, FIG. 25 shows input action sequence information in the case of a user who is comparatively quick to operate an information device. For simplification, it is assumed that the same input actions are executed, and that a decision making time to perform each input action is different. FIG. 25(c) shows the case where input action sequence information is calculated as in the description of FIG. 24. In this case, the decision making time threshold $\alpha$ can be determined as 2.7 seconds since $B_2$ is 2.7.

Next, in Step S2003, in the case where the confusion judging unit 1902 monitoring dwell times judges that confusion occurs when the dwell time exceeds the decision making time threshold $\alpha$, a transition is to Step S213 is made. In the case where the decision making time threshold $\alpha$ is not greater than the decision making time, the confusion judging unit 1902 judges whether an input action is executed or not based on a device operation timing notification signal 118. With some input action, a transition is made to Step S215 where the next input action is executed. Without any input action, confusion judgment is made by returning to Step S2003 where the judgment is made again.

The remaining processes are the same as those in the first embodiment, and thus descriptions for these are omitted.

With the structure described above, it becomes possible to predict a dwell time including a decision making time on which delay which occurs in a confused state is reflected, and to immediately detect confusion. This makes it possible to provide a user support device which starts user support timely.

As in the first embodiment, it is effective to use dwell time instead of a decision making time because an eye movement time and an operation time are shorter than the decision making time.

INDUSTRIAL APPLICABILITY

User support devices according to the present invention are applicable to devices which receive input actions from users through hierarchical menus. For example, the user support devices are applicable to various exclusive devices such as DVD recorders, mobile phones, and car navigation systems; and computers in which operation systems and application programs function. Further, the user support devices are applicable to devices for evaluating the usability of these devices.

The invention claimed is:

1. A user support device which supports a user who makes one or more transitions between menus arranged in a tree structure by executing a plurality of input actions in the menus, said user support device comprising:
    a confused state judging unit operable to (i) select, from among a sequence of decision making times required for the user to decide to execute the plurality of input actions executed by the user, a sub-sequence of decision making times, and (ii) judge whether the user is in a confused state or not based on a judgment standard that the user is in the confused state when an increase is observed in the selected sub-sequence of decision making times; and
    an operation support processing unit operable to provide operation support in a case where said confused state judging unit judges that the user is in the confused state,
    wherein each decision making time in the sequence of decision making times corresponds to one of the plurality of input actions executed by the user, and wherein the sub sequence of decision making times includes a target decision making time calculated for the User to decide to execute an input action executed by the user from among the plurality of input actions executed by the user, the target decision making time being determined by an input action executed by the user immediately preceding an input action last executed by the user,
    wherein each decision making time in the sequence of decision making times (i) corresponds to one of the plurality of input actions executed by the user, and (ii) is calculated by subtracting a sum of an eye movement time and an operation time from a dwell time,
    wherein the eye movement time is an approximated time required for the user to perceive a menu,
    wherein the operation time is a time required for the user to execute an input action corresponding to the decision making time, and
    wherein the dwell time is an elapsed time for the user to decide to execute the input action corresponding to the decision making time.

2. The user support device according to claim 1,
    wherein, in a case where the input action immediately preceding the last input action executed by the user is an input action to make a transition to a current menu from another menu from among the menus, said confused state judging unit is operable to select, as the selected sub-sequence of decision making times, a sub-sequence of decision making times which includes one or more target decision making times required for the user to decide to execute one or more input actions to make the transition to the current menu.

3. The user support device according to claim 2,
    wherein said confused state judging unit is operable to approximate the selected sub-sequence of decision making times to a sub-sequence of dwell times,
    wherein the sub-sequence of dwell times indicates one or more dwell times, each of which correspond to one of the one or more input actions executed by the user to make the transition to the current menu, and
    wherein each of the one or more dwell times indicates an elapsed time for the user to decide to execute the corresponding one of the one or more input actions executed by the user to make the transition to the current menu.

4. The user support device according to claim 1,
    wherein, in a case where the input action immediately preceding the input action last executed by the user is an input action to make a transition to a current menu from a higher-layer menu from among the menus, said confused state judging unit is operable to select, as the selected sub-sequence of decision making times, a sub-sequence of decision making times which includes one or more target decision making times required for the user to decide to execute one or more input actions executed by the user in one of the menus, from among the menus, that leads to the current menu.

5. The user support device according to claim 4,
    wherein said confused state judging unit is operable to approximate the selected sub-sequence of decision making times to a sub-sequence of dwell times,
    wherein the sub-sequence of dwell times indicates one or more dwell times, each of which correspond to one of the one or more input actions executed by the user in one of the menus, from among the menus, that leads to the current menu, and
    wherein each of the one or more dwell times indicates an elapsed time for the user to decide to execute the corresponding one of the one or more input actions executed by the user in one of the menus, from among the menus, that leads to the current menu.

6. The user support device according to claim 1,
wherein, in a case where the input action immediately preceding the input action last executed by the user is an input action within a current menu from among the menus, said confused state judging unit is operable to select, as the selected sub-sequence of decision making times, a sub-sequence of decision making times required for the user to decide to execute one or more input actions executed by the user within the current menu.

7. The user support device according to claim 6,
wherein said confused state judging unit is operable to approximate the selected sub-sequence of decision making times to a sub-sequence of dwell times,
wherein the sub-sequence of dwell times indicates one or more dwell times, each of which correspond to one of the one or more input actions executed by the user within the current menu, and
wherein each of the one or more dwell times indicates an elapsed time for the user to decide to execute the corresponding one of the one or more input actions executed by the user within the current menu.

8. The user support device according to claim 6,
wherein selection items are displayed in the current menu, and
wherein said operation support processing unit is operable to present, to the user, description information for each of the selection items, as the operation support when said confused state judging unit makes the positive judgment that the user is in the confused state.

9. The user support device according to claim 1,
wherein said confused state judging unit is operable to judge that the user is in the confused state in a case where a decision making time that is last in the selected sub-sequence of decision making times is longer than a threshold value determined based on one or more other decision making times in the selected sub-sequence of decision making time.

10. The user support device according to claim 1,
wherein the increase is observed in the selected sub-sequence of decision making times when the target decision making time calculated for the user to decide to execute the input action last executed by the user is greater than a decision making time calculated for the user to decide to execute the input action immediately preceding the input action last executed by the user.

11. A user support device which supports a user who makes one or more transitions between menus arranged in a tree structure by executing a plurality of input actions in the menus, wherein the user has a possibility of falling into one or more confused states in various categories, said user support device comprising:
a confused state judging unit operable to (i) select, for each of the various categories, a sub-sequence of decision making times from among a sequence of decision making times required for the user to decide to execute the plurality of input actions executed by the user, and (ii) judge, for each of the various categories, whether the user is in a confused state from among the one or more confused states or not based on a judgment standard that the user is in the confused state from among the one or more confused states when an increase is observed in the selected sub-sequence of decision making times;
a confusion and operation support association table storage unit in which confusion and operation support information is stored, the confusion and operation support information indicating support methods corresponding to the one or more confused states in the various categories; and
an operation support processing unit operable to (i) determine a support method based on a positive judgment that the user is in the confused state from among the one or more confused states with reference to the confusion and operation support information stored in said confusion and operation support association table storage unit, and (ii) provide operation support according to the determined support method,
wherein each decision making time in the sequence of decision making times corresponds to one of the plurality of input actions executed by the user,
wherein the selected sub-sequence of decision making times includes a target decision making time calculated for the user to decide to execute an input action executed by the user from among the plurality of input actions executed by the user, the target decision making time being determined by an input action executed by the user immediately preceding an input action last executed by the user,
wherein each decision making time in the sequence of decision making times (i) corresponds to one of the plurality of input actions executed by the user, and (ii) is calculated by subtracting a sum of an eye movement time and an operation time from a dwell time,
wherein the eye movement time is an approximated time required for the user to perceive a menu,
wherein the operation time is a time required for the user to execute an input action corresponding to the decision making time, and
wherein the dwell time is an elapsed time for the user to decide to execute the input action corresponding to the decision making time.

12. The user support device according to claim 11,
wherein said confused state judging unit is operable to judge that the user is in the confused state from among the one or more confused states in a case where a decision making time that is last in the selected sub-sequence of decision making times for each of the various categories of the one or more confused states is longer than a threshold value determined based on one or more other decision making times in the selected sub-sequence of decision making times.

* * * * *